(12) United States Patent
Kato et al.

(10) Patent No.: US 6,347,145 B2
(45) Date of Patent: *Feb. 12, 2002

(54) METHOD AND APPARATUS OF ENCIPHERING AND DECIPHERING DATA USING KEYS ENCIPHERED AND DECIPHERED WITH OTHER KEYS

(75) Inventors: Takehisa Kato, Yokohama; Naoki Endoh, Chiba-ken; Hiroaki Unno, Yokohama; Tadashi Kojima, Yokohama; Koichi Hirayama, Yokohama, all of (JP)

(73) Assignee: Kabushiki Kaisha Toshiba, Kawasaki-shin (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,337

(22) Filed: Jun. 26, 1997

(30) Foreign Application Priority Data

Jun. 28, 1996 (JP) .............................. 8-170399
May 27, 1997 (JP) .............................. 9-136709

(51) Int. Cl.$^7$ ................................................ H04L 9/00
(52) U.S. Cl. ...................................... 380/284; 380/278
(58) Field of Search ............................ 380/4, 20, 21, 380/24, 277–278, 283–284; 705/57–59

(56) References Cited

U.S. PATENT DOCUMENTS

| | | | | |
|---|---|---|---|---|
| 4,991,208 A | * | 2/1991 | Walker et al. | 380/20 |
| 5,010,571 A | * | 4/1991 | Katznelson | 38/4 |
| 5,241,597 A | * | 8/1993 | Bright | 380/21 |
| 5,301,247 A | * | 4/1994 | Rasmussen et al. | 380/43 |
| 5,319,705 A | * | 6/1994 | Halter et al. | 380/4 |
| 5,392,351 A | * | 2/1995 | Hasebe et al. | 380/4 |
| 5,563,947 A | * | 10/1996 | Kikinis | 380/4 |
| 5,615,264 A | * | 3/1997 | Kazmierczak et al. | 380/4 |
| 5,910,987 A | * | 6/1999 | Ginter et al. | 380/24 |
| 6,085,323 A | * | 7/2000 | Shimizu et al. | 713/201 |

* cited by examiner

*Primary Examiner*—Gail Hayes
*Assistant Examiner*—Douglas Meislahn
(74) *Attorney, Agent, or Firm*—Pillsbury Winthrop LLP

(57) ABSTRACT

On a recording medium, first information obtained by enciphering data with the first key and second information obtained by enciphering the first key with each of the predetermined second keys are recorded. A deciphering method is characterized by comprising the steps of inputting the first and second information, deciphering the first key using at least one of the second keys, determining by a specific method that the obtained first key is correct, and then deciphering the data using the first key to obtain the data.

23 Claims, 11 Drawing Sheets

METHOD AND APPARATUS OF ENCIPHERING AND DECIPHERING DATA USING KEYS ENCIPHERED AND DECIPHERED WITH OTHER KEYS

BACKGROUND OF THE INVENTION

The present invention relates to an enciphering method, deciphering method, recording and reproducing device, deciphering device, deciphering unit device, recording medium, recording-medium manufacturing method, and key control method which are for preventing the digitally recorded data from being copied from a recording medium.

Compact disks and laser disks have been available as recording mediums that record digitized data (e.g., documents, sound, images, or programs). Floppy disks and hard disks have been used as recording mediums for computer programs and data. In addition to those recording mediums, a DVD (digital video disk), which is a large-capacity recording medium, has been developed.

Since the aforementioned various digital recording mediums record the digital data (including the compressed or encoded data, which can be decoded later) as it is, the recorded data can be copied easily to another recording medium without impairing the quality of sound or the quality of image, which enables a large number of reproductions to be made, contributing to literary piracy.

In summary, when the data is copied from a digital recording medium, the data can be copied with the sound quality and picture quality of the master remaining unchanged, or without the deterioration of sound quality or picture quality. This has caused the problem of permitting the wrongful conduct of making unauthorized copies of the original and selling them without paying a royalty.

BRIEF SUMMARY OF THE INVENTION

Accordingly, it is an object of the present invention to provide an enciphering method, deciphering method, recording and reproducing device, deciphering device, deciphering unit device, recording medium, recording-medium manufacturing method, and key control method which are for preventing an unauthorized copy of digital recording mediums.

According to one aspect of the present invention, there is provided an enciphering method comprising the steps of: enciphering data with a first key; and enciphering the first key with each of a plurality of predetermined second keys.

According to another aspect of the present invention, there is provided a recording medium having information items recorded thereon, the information items comprising: first information obtained by enciphering data with a first key; and second information obtained by enciphering the first key with each of a plurality of predetermined second keys.

According to another aspect of the present invention, there is provided a recording medium manufacturing method comprising the steps of: obtaining first information by enciphering data with a first key; obtaining second information obtained by enciphering the first key with each of a plurality of predetermined second keys; and recording the first and second information on the same recording medium.

According to another aspect of the present invention, there is provided a deciphering method comprising the steps of: inputting first information obtained by enciphering data with a first key and second information obtained by enciphering the first key with each of a plurality of predetermined second keys; deciphering the first key using at least one of the second keys to obtain the first key; determining by a specific method whether or not the obtained first key is correct; and deciphering the data using the first key after the determination to obtain the data.

According to another aspect of the present invention, there is provided a deciphering device comprising: input means for inputting first information obtained by enciphering data with a first key and second information obtained by enciphering the first key with each of a plurality of predetermined second keys; storage means for storing at least one of the second keys; and deciphering means for deciphering the first key from the second information inputted from the input means using at least one of the second keys in the storage means, determining by a specific method whether or not the obtained first key is correct, and deciphering the data from the first information using the first key after the determination to obtain the data.

According to another aspect of the present invention, there is provided a recording and reproducing device comprising: reading means for reading first information and second information from a recording medium on which the first information obtained by enciphering data with a first key and the second information obtained by enciphering the first key with each of a plurality of predetermined second keys have been stored; storage means for storing at least one of the second keys; and deciphering means for deciphering the first key from the second information read by the reading means using at least one of the second keys in the storage means, determining by a specific method whether or not the obtained first key is correct, and deciphering the data from the first information using the first key after the determination to obtain the data.

According to another aspect of the present invention, there is provided a key control method comprising the steps of: causing a first caretaker to take custody of a plurality of predetermined second keys; causing a second caretaker to take custody of first information obtained by enciphering data with a first key and second information obtained by enciphering the first key with each of the predetermined second keys; and causing a third caretaker to take custody of at least one of the second keys.

According to another aspect of the present invention, there is provided a deciphering device comprising: reading means for reading first information, second information, and third information from a recording medium on which the first information obtained by enciphering data with a first key, the second information obtained by enciphering the first key with each of a plurality of predetermined second keys, and the third information used for key determination have been stored; storage means for storing at least one of the second keys; first deciphering means for deciphering one of the enciphered first keys selected in the order determined from the second information using one second key selected in the order determined from the second keys stored in the storage means, determining on the basis of the deciphering result and the third information whether or not the first key obtained by the deciphering is correct, and repeating the selection and the determination until the first key determined to be correct has been obtained; and second deciphering means for deciphering the data from the first information using the first key the first deciphering means has determined to be correct.

According to another aspect of the present invention, there is provided a deciphering device comprising: a first unit built in a driving unit of a recording medium or connected to the driving unit of the recording medium without the CPU bus of a computer, including: means for transferring first information obtained by enciphering the data read from the recording medium with a first key, second information obtained by enciphering the first key with each of a plurality of predetermined second keys, and third information used for key determination in such a manner that at least the second information and third information are transferred safely without being externally acquired; and a second unit connected to the first unit via the CPU bus of the computer including: means for receiving the first information, second information, and third information from the first unit via the CPU bus of the computer in such a manner that at least the second information and third information are received safely without being externally acquired; storage means for storing at least one of the second keys; first deciphering means for deciphering one of the enciphered first keys selected in the order determined from the second information using one second key selected in the order determined from the second keys stored in the storage means, determining on the basis of the deciphering result and the third information whether or not the first key obtained by the deciphering is correct, and repeating the selection and the determination until the first key determined to be correct has been obtained; and second deciphering means for deciphering the data from the first information using the first key the first deciphering means has determined to be correct.

According to another aspect of the present invention, there is provided a deciphering device comprising: reading means for reading first information, second information, third information, and fourth information from a recording medium on which the first information obtained by enciphering a third key with a first key, the second information obtained by enciphering the first key with each of a plurality of predetermined second keys, the third information used for key determination, and the fourth information obtained by enciphering data with the third key have been stored; storage means for storing at least one of the second keys; first deciphering means for deciphering one of the enciphered first keys selected in the order determined from the second information using one second key selected in the order determined from the second keys stored in the storage means, determining on the basis of the deciphering result and the third information whether or not the first key obtained by the deciphering is correct, and repeating the selection and the determination until the first key determined to be correct has been obtained; second deciphering means for deciphering the third key from the first information using the first key the first deciphering means has determined to be correct; and third deciphering means for deciphering the data from the fourth information using the third key obtained by the second deciphering means.

According to another aspect of the present invention, there is provided a deciphering method comprising the steps of: reading first information, second information, and third information from a recording medium on which the first information obtained by enciphering data with a first key, the second information obtained by enciphering the first key with each of a plurality of predetermined second keys, and the third information used for key determination have been stored; deciphering one of the enciphered first keys selected in the order determined from the second information using one second key selected in the order determined from the second keys, determining on the basis of the deciphering result and the third information whether or not the first key obtained by the deciphering is correct, and repeating the selection and the determination until the first key determined to be correct has been obtained; and deciphering the data from the first information using the first key determined to be correct.

According to another aspect of the present invention, there is provided a deciphering method comprising the steps of: transferring first information obtained by enciphering the data read from a recording medium with a first key, second information obtained by enciphering the first key with each of a plurality of predetermined second keys, and third information used for key determination from a first unit built in a driving unit of the recording medium or connected to the driving unit of the recording medium without the CPU bus of a computer to a second unit via the CPU bus of the computer in such a manner that at least the second information and third information are transferred safely without being externally acquired; and in the second unit, deciphering one of the enciphered first keys selected in the order determined from the second information using one second key selected in the order determined from the second keys stored in the storage means, determining on the basis of the deciphering result and the third information whether or not the first key obtained by the deciphering is correct, repeating the selection and the determination until the first key determined to be correct has been obtained, and deciphering the data using the first key determined to be correct.

According to another aspect of the present invention, there is provided a deciphering method comprising the steps of: reading first information, second information, third information, and fourth information from a recording medium on which the first information obtained by enciphering at least a third key with a first key, the second information obtained by enciphering the first key with each of a plurality of predetermined second keys, the third information used for key determination, and the fourth information obtained by enciphering data with the third key have been stored; deciphering one of the enciphered first keys selected in the order determined from the second information using one second key selected in the order determined from the second keys, determining on the basis of the deciphering result and the third information whether or not the first key obtained by the deciphering is correct, and repeating the selection and the determination until the first key determined to be correct has been obtained; deciphering the third key from the first information using the first key determined to be correct; and deciphering the data from the fourth information using the third key obtained.

According to another aspect of the present invention, there is provided a deciphering unit device that receives information via the CPU bus of a computer from a bus transfer unit built in a driving unit of a recording medium or connected to the driving unit of the recording medium without the CPU bus of the computer and deciphers data on the basis of the information, the deciphering unit device comprising: means for receiving first information obtained by enciphering the data read from the recording medium with a first key, second information obtained by enciphering the first key with each of a plurality of predetermined second keys, and third information used for key determination from the bus transfer unit via the CPU bus of the computer in such a manner that at least the second information and third information are received safely without being externally acquired; storage means for storing at least one of the second keys; first deciphering means for deciphering one of the enciphered first keys selected in the order determined from the second information using one second key selected in the order determined from the second keys stored in the storage means, determining on the basis of the deciphering result and the third information whether or not the first key obtained by the deciphering is correct, and repeating the selection and the determination until the first key determined to be correct has been obtained; and second deciphering means for deciphering the data from the first information using the first key the first deciphering means has determined to be correct.

In each of the above categories, the data may include at least one of key information, documents, sound, images, and programs.

With the present invention, only the correct party having at least one of the second keys can get the first key and therefore can get the plain data of the data enciphered using the first key. As a result, the wrongful conduct of making unauthorized copies and selling the thus copied mediums can be prevented, thereby protecting copyrights.

Moreover, with the present invention, even if the data flowing over the signal line connecting the enciphering unit to the deciphering unit is stored, the stored data cannot be reproduced or used, because the data is the enciphered data. In addition, because the information necessary for enciphering the data is created on the basis of, for example, random numbers, and cannot be reproduced later, the stored data cannot be reproduced or used, even if the second key (master key) in the deciphering unit has been broken. As a result, the wrongful conduct of making unauthorized copies and selling the thus copied mediums can be prevented, thereby protecting copyrights.

Still furthermore, with the present invention, because the enciphering unit and deciphering unit can be designed separately from the essential portion of the reproducing section of the digital recording and reproducing apparatus, even if the cipher is broken, the enciphering unit and deciphering unit have only to be replaced to overcome this problem.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Hereinafter, referring to the accompanying drawings, embodiments of the present invention will be explained.

In the embodiments, the operation of enciphering a certain data item a using key K is expressed as $E_K(a)$ and the operation of deciphering a certain data item a using key K is expressed as $D_K(a)$. By this way of expression, the operation of enciphering and deciphering a certain data item a using key K is expressed as $D_K(E_K(a))$, for example.

In the embodiments, there is a case where a certain data item is first deciphered and then the deciphered data item is enciphered to restore the original data item. This is based on the fact that the deciphering of the data has the same function as the enciphering of the data. Specifically, to return the enciphered data to the original data, the key used for deciphering must be known. Once the key is known, enciphering the deciphered data produces the original data that was first deciphered. If the cipher key is x and the data item is y, the operation will be expressed as:

$$E_x(D_x(y))=y$$

In the embodiments, explanation will be given using an example of a system that reads the image data compressed and enciphered according to the MPEG 2 data compression standard from a DVD and enciphers, decodes, and reproduces the read-out data.

First Embodiment

Hereinafter, a first embodiment of the present invention will be explained.

Figure 1:
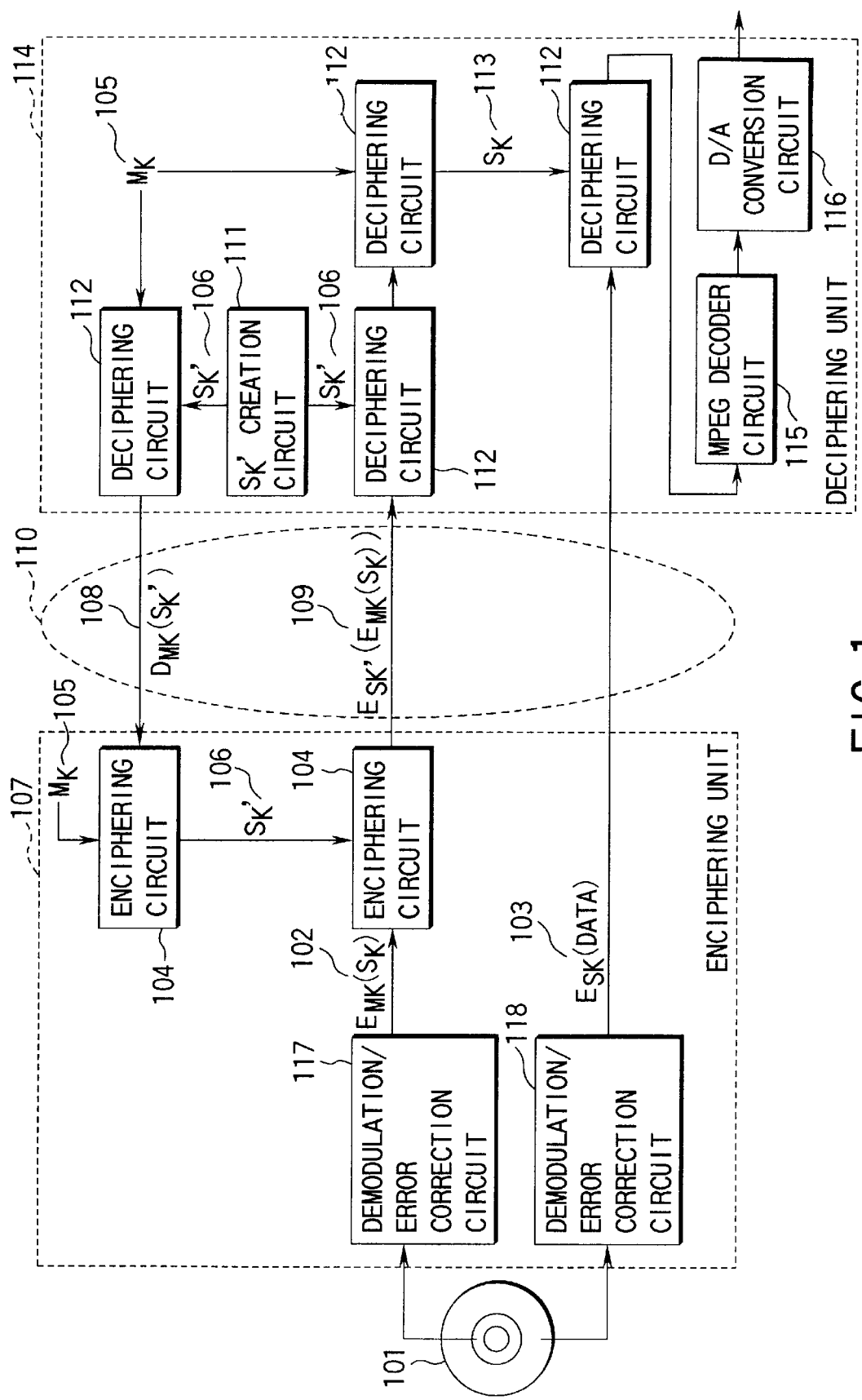
FIG. 1 is a block diagram of a system according to a first embodiment of the present invention.
Figure 2:
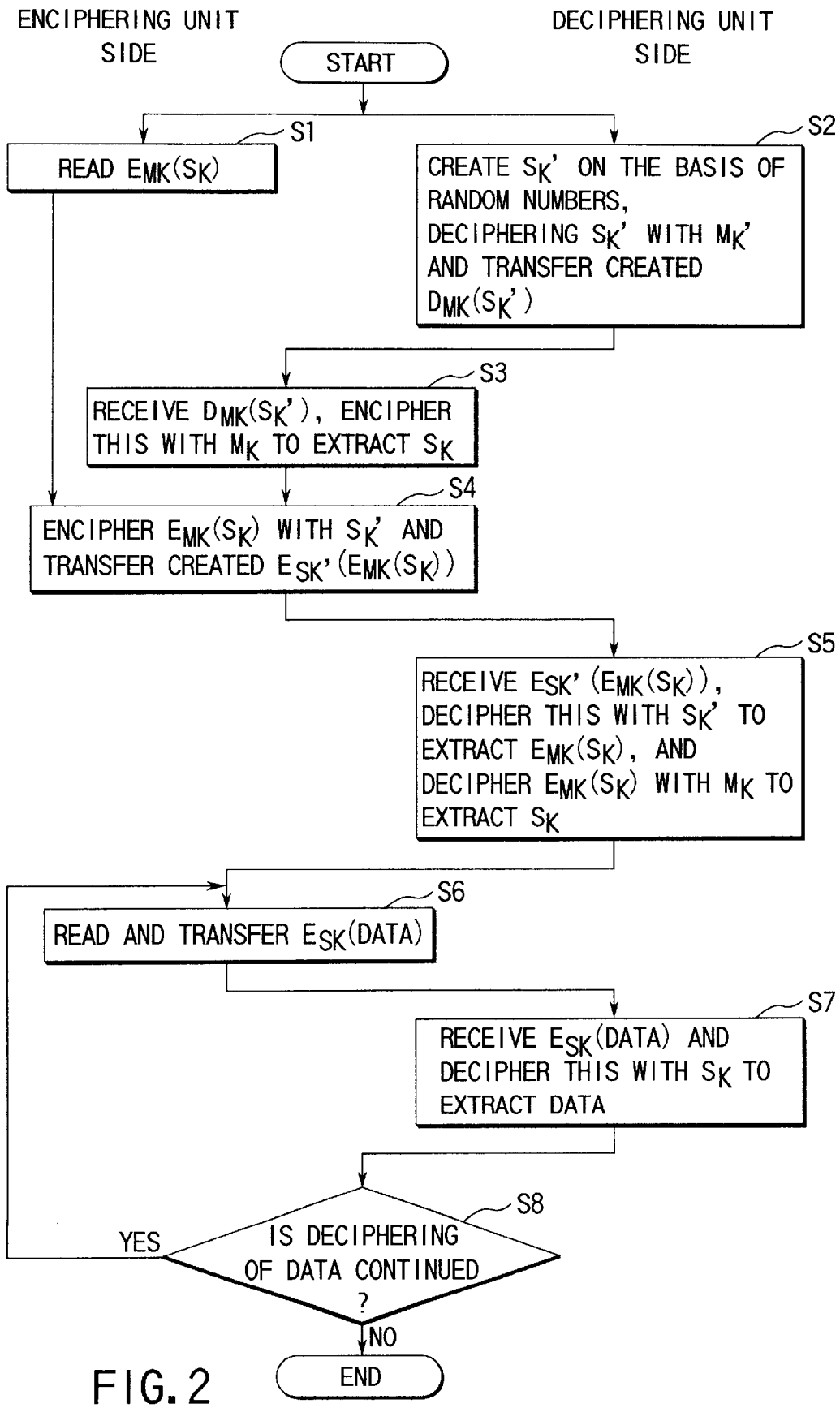
FIG. 2 is a flowchart for the operation of the first embodiment.

FIG. 1 is a block diagram of a system according to a first embodiment of the present invention. FIG. 2 is a flowchart for the operation of the first embodiment.

The system related to the first embodiment is connected to the CPU BUS of the CPU (not shown) used for reproduction in a computer, such as a personal computer. The system is designed to allow the enciphered data ($E_{SK}$(Data) explained later) to flow over the CPU BUS. FIG. 1 shows only the sections related to the CPU used for reproduction.

As shown in FIG. 1, the system of the first embodiment comprises a DVD driving unit (not shown) that reads the data from a DVD 101, an enciphering unit 107 that is connected to the DVD driving unit without the CPU BUS or is built in the DVD driving unit, and a deciphering unit 114.

The enciphering unit 107 and deciphering unit 114 are connected to the CPU BUS 110. The deciphering unit 114 outputs the data via, for example, an I/O port, not via the CPU BUS. That is, in the embodiment, the input and output of the data is carried out without the CPU BUS, whereas the CPU BUS is used for the data transfer between the enciphering unit 107 and the deciphering unit 114.

The enciphering unit 107 includes a demodulation/error correction circuit 117, a demodulation/error correction circuit 118, and an enciphering circuit 104. Although in FIG. 1, the enciphering unit 107 has two enciphering circuits 104, it is assumed that it actually has one enciphering circuit. The enciphering unit 107 is assumed to be composed of a single independent IC chip. The demodulation/error correction circuit 117 and demodulation/error correction circuit 118 may be provided in the unit (the DVD driving unit) in the preceding stage, not in the enciphering unit 107.

The deciphering unit 114 includes a deciphering circuit 112 and a session key creation circuit 111 that creates a second session key $S_K'$. In the embodiment, the deciphering unit 114 is assumed to include an MPEG decoder circuit 115 and a converter circuit 116 that converts the digital enciphered image data into analog data. Although in FIG. 1, the deciphering unit 114 has four deciphering circuits 112, it is assumed that it actually has one deciphering circuit. The deciphering unit 114 is assumed to be composed of a single independent IC chip.

In each of the enciphering unit 107 and deciphering unit 114, a master key, explained later, has been registered. It is assumed that the master key has been recorded in a secret area in each of the enciphering unit chip and the deciphering unit chip so that the user cannot externally take out the master key.

A control section (not shown) is assumed to control the entire system. The control section is realized by, for example, executing a program on the CPU in the computer. Concrete examples of control by the control section include an instruction to read the data from a DVD, the specification of data transfer destination, and an instruction to output the data from the deciphering unit 114. The control section may be triggered, for example, by the user via a user interface, or by a process in an application program.

In the first embodiment, a first session key is represented by $S_K$, a second session key $S_K'$, the master key $M_K$, and image data (i.e., the data to be enciphered) Data.

In FIG. 1, numeral 102 indicates $E_{MK}(S_K)$ created by enciphering the first session key $S_K$ using the master key $M_K$, 103 $E_{SK}$(Data) created by enciphering the image data Data using the first session key $S_K$, 105 the master key $M_K$, 106 a second session key $S_K'$, 108 $D_{MK}(S_K')$ created by deciphering the second session key $S_K'$ using the master key $M_K$, 109 $E_{SK'}(E_{MK}(S_K))$ created by enciphering the first session key $E_{MK}(S_K)$ enciphered with the master key $M_K$ using the second session key $S_K'$, and 113 the first session key $S_K$.

Figure 3:
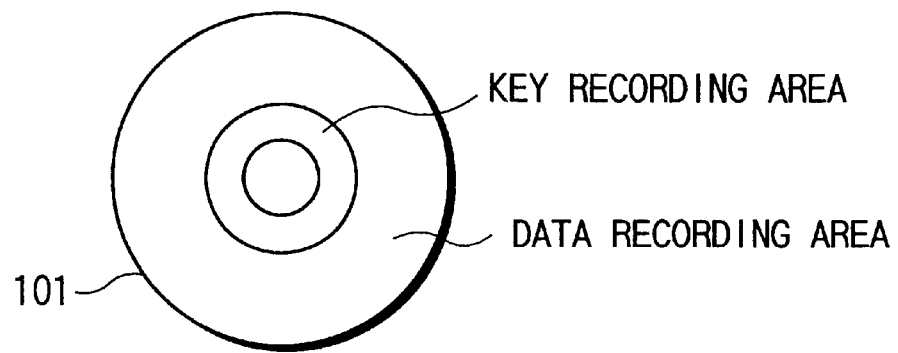
FIG. 3 illustrates an example of a format in which the enciphered key and the enciphered data are stored on a recording medium.

As shown in FIG. 3, it is assumed that on the DVD 101, $EM_K(S_K)$ created by enciphering the first session key $S_K$ using the master key $M_K$ is recorded in the key recording area (lead-in area) in the innermost circumference portion and the $E_{SK}$(Data) created by enciphering the image data Data using the first session key $S_K$ is recorded in the data recording area (data area).

Hereinafter, the operation of the first embodiment will be explained by reference to the flowchart of FIG. 2.

At step S1, the first session key $E_{MK}(S_K)$ enciphered using the master key $M_K$ is read from the DVD 101, on which the DVD driving unit (not shown) has recorded the first session key, and then is loaded into the enciphering unit 107. At that time, the demodulation/error correction circuit 117 performs demodulation and data error correction.

At step S2, in the deciphering unit 114, the session key creation circuit 111 creates a second session key $S_K'$ using random numbers, such as time data from a clock (not shown). Then, the deciphering circuit 112 deciphers the created second session key $S_K'$ using the master key $M_K$ to create $D_{MK}(S_K')$ and sends it to the enciphering unit 107 via the CPU BUS 110.

As for the timing of generating random numbers (e.g., the timing of inputting time information), for example, the timing with which the signal indicating that the DVD 101 has been loaded into the DVD driving unit is asserted may be used.

The session creation circuit 111 may be composed of a random-number generator that is as long as the key. When a key is created using random numbers all of whose bits may take 0s or 1s, it is necessary to perform a check process to prevent all of the bits from taking 0s or 1s.

At step S3, using the master key $M_K$, the enciphering circuit 104 of the enciphering unit 107 enciphers $D_{MK}(S_K')$ received via the CPU BUS 110.

Namely, from $E_{MK}(D_{MK}(S_K'))=S_K'$ a second session key $S_K'$ created at the session key creation circuit 111 of the deciphering unit 114 can be obtained.

The second session key $S_K'$ created at the session key creation circuit 111 is designed to prevent its contents from being known even if it is stolen on the CPU BUS 110.

Then, at step S4, using the second session key $S_K'$, the enciphering unit 107 enciphers the enciphered first session key $E_{MK}(S_K)$ recorded on the DVD 101 to create $E_{SK'}(E_{MK}(S_K))$, and sends this to deciphering unit 114.

Then, at step S5, the deciphering circuit 112 of the deciphering unit 114 deciphers $E_{SK'}(E_{MK}(S_K))$ received via the CPU BUS 110 using the second session key $S_K'$ and produces:

$$D_{SK'}(E_{SK'}(E_{MK}(S_K)))=E_{MK}(S_K)$$

Furthermore, $E_{MK}(S_K)$ obtained at the deciphering circuit 112 is deciphered using the master key $M_K$ to produce:

$$D_{MK}(E_{MK}(S_K))=S_K$$

Thus, this gives the first session key $S_K$.

After the first session key $S_K$ has been obtained as described above, at step S6, the image data $E_{SK}$(Data) enciphered using the first session key $S_K$ recorded on the DVD 101 by the DVD driving unit (not shown) is read out and loaded into the enciphering unit 107. At that time, the demodulation/error correction circuit 118 performs demodulation and corrects errors in the data. Then, $E_{SK}$(Data) is sent to the enciphering unit 107 via the CPU BUS 110.

At step S7, the deciphering circuit 112 of the deciphering unit 114 deciphers $E_{SK}$(Data) received via the CPU BUS 110 using the first session key $S_K$ and produces:

$$D_{SK}(E_{SK}(Data))=Data$$

Then, the enciphered image data is deciphered to produce Data.

Then, step S6 and step S7 are repeated until for example, the process of the data to be deciphered (i.e., $E_{SK}$(Data)) has been completed or the stop of the process has been requested.

When the image data Data thus obtained has been compressed according to, for example, the MPEG2 data compression standard, the image data is decoded at an MPEG decoder circuit 115. After the decoded signal has been converted by a D/A converter circuit 116 into an analog signal, the analog signal is sent to an imaging device (not shown), such as a television, which reproduces the image.

Step 1 may be executed before or after step S2 and step S3.

Step S6 and step S7 may be executed by the method of carrying out the steps in units of $E_{SK}(Data)$, the method of reading a specific number of $E_{SK}(Data)$ at step S6, storing the read-out data in a buffer temporarily, and then deciphering $E_{SK}(Data)$ in the buffer at step S7, or the method of carrying out step S6 and step S7 in a pipeline processing manner.

Moreover, the deciphering circuit 112 may transfer the image data $E_{SK}(Data)$ to the MPEG decoder circuit 115 in units of one Data item or a specific number of Data items.

Figure 4:
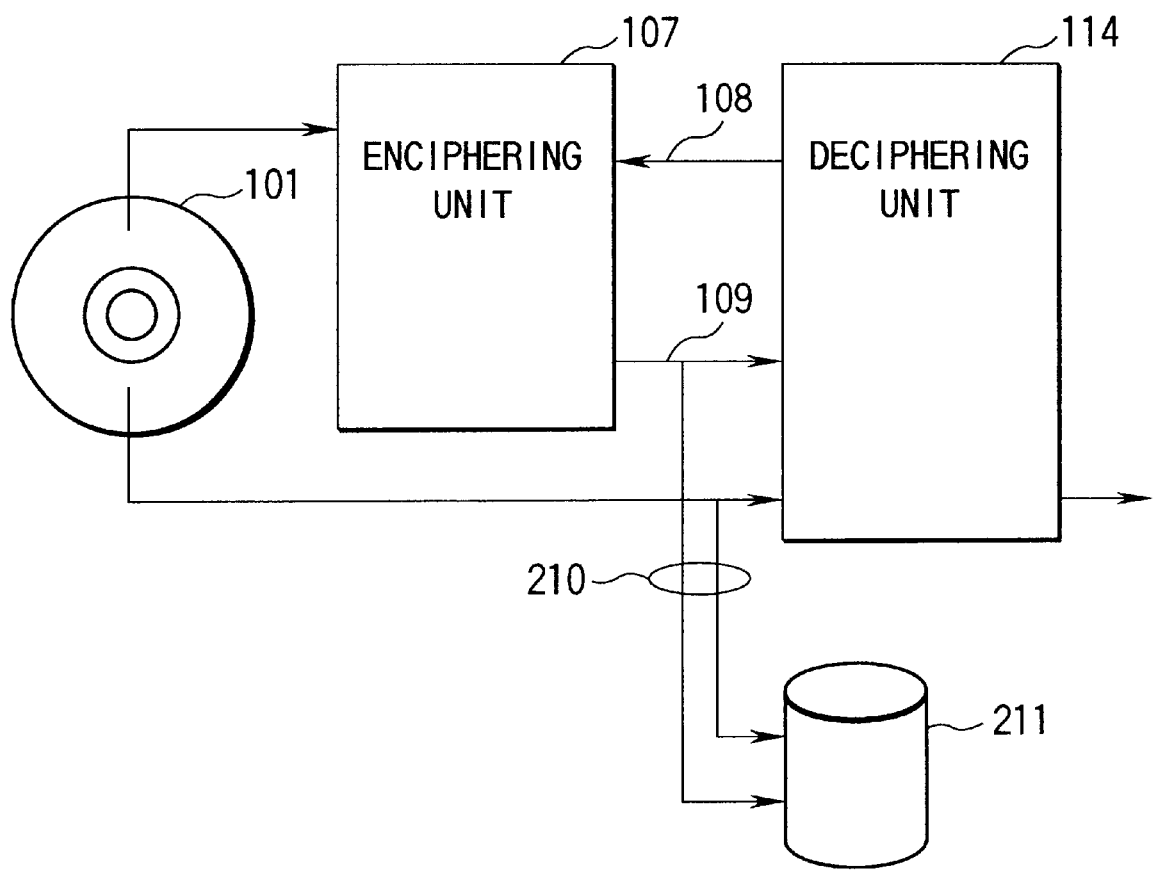
FIG. 4 is a diagram to help explain a case where the data is stored from the CPU BUS.

As described above, with the first embodiment, when the data is reproduced from a medium on which the digitized data has been enciphered and recorded (when the enciphered data is deciphered), the deciphered data is prevented from flowing over the CPU BUS of the computer and the second session key $S_K'$ used to encipher the first session key necessary for deciphering the enciphered data flowing over the CPU BUS is created on the basis of information that changes each time the data is reproduced, such as time information. Therefore, even when the data flowing over the CPU BUS 110 is stored from signal lines 210 into a digital storage medium 211 as shown in FIG. 4, the data cannot be reproduced or used.

As a result, the wrongful conduct of making unauthorized copies and selling the thus copied mediums can be prevented, thereby protecting copyrights.

Furthermore, with the embodiment, as seen from FIG. 1, because the circuits used for enciphering and deciphering can be designed separately from the essential portion of the reproducing section of the digital recording and reproducing apparatus, such as a DVD, even if the cipher is broken, the deciphering unit 114 (or the enciphering unit 107 and deciphering unit 114) has only to be replaced to overcome this problem.

While in the first embodiment, the enciphering unit 107 has one enciphering circuit, it may have two enciphering circuits. Moreover, although in the embodiment, the deciphering unit 114 has one deciphering circuit, it may have two, three, or four deciphering circuits. In these cases, it is desirable that the enciphering circuits should be paired with the corresponding deciphering circuits and each pair be used independently or in a shared manner.

When a set of an enciphering circuit and the corresponding deciphering circuit is used independently, an enciphering method different from that in another enciphering circuit and deciphering circuit may be used in the enciphering circuit and its corresponding deciphering circuit in the independent set.

Second Embodiment Hereinafter, a second embodiment of the present invention will be explained.

What will be explained in the second embodiment is an example suitable for a case where a plurality of predetermined master keys are prepared and one or more of them are allocated to deciphering unit makers (or DVD makers and distributors)

Figure 5:
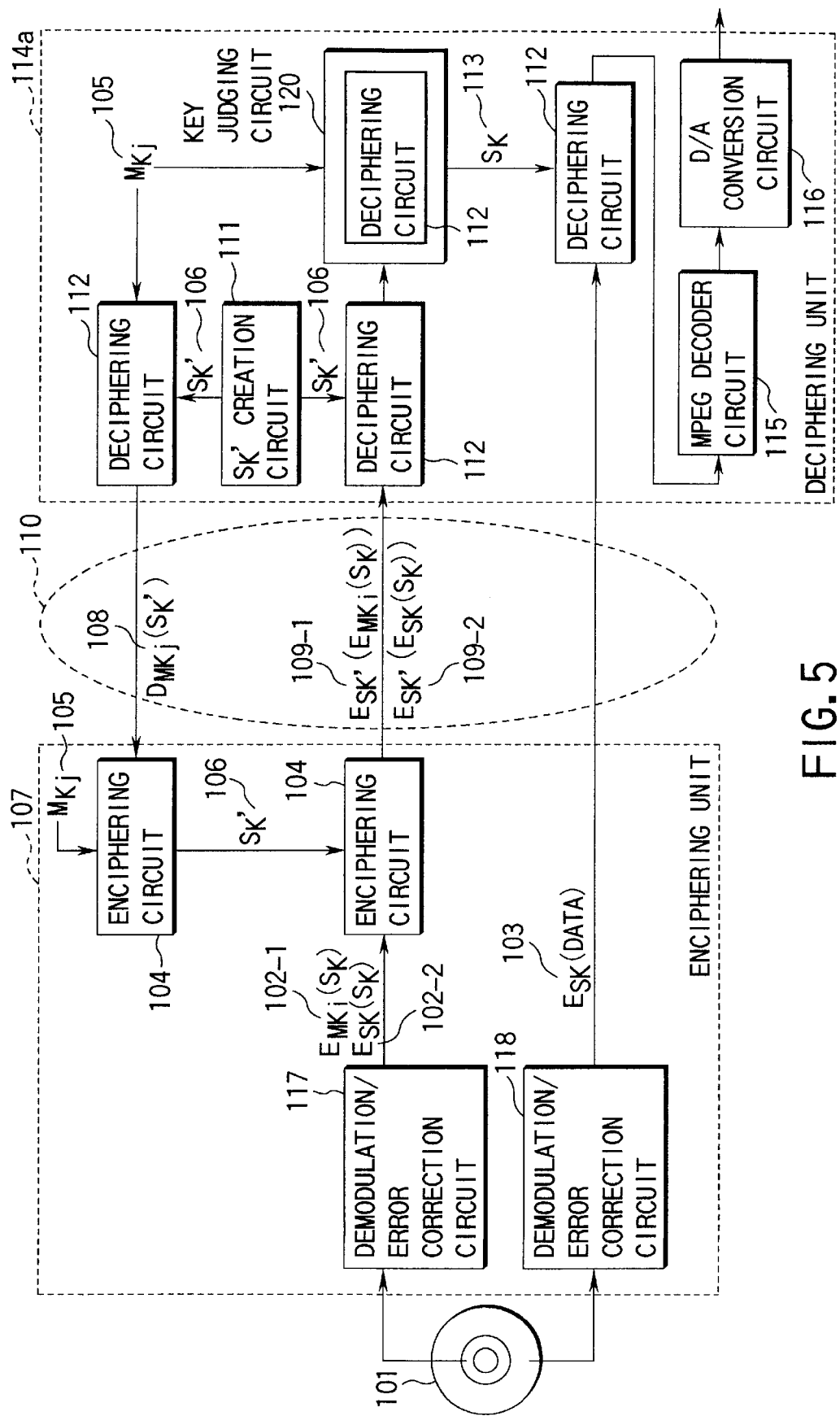
FIG. 5 is a block diagram of a system according to a second embodiment of the present invention.
Figure 7:
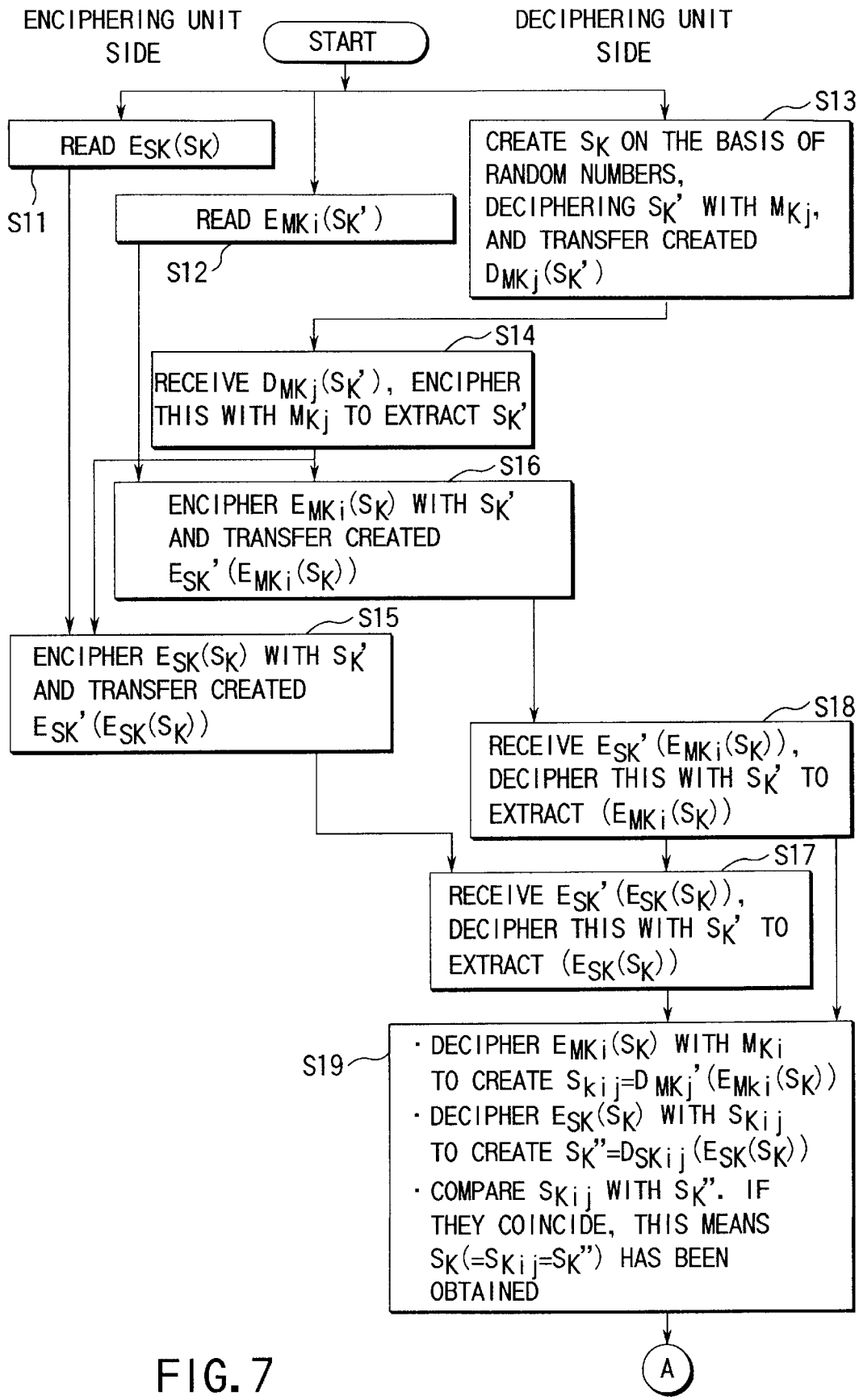
FIG. 7 is a flowchart for the operation of the second embodiment.
Figure 8:
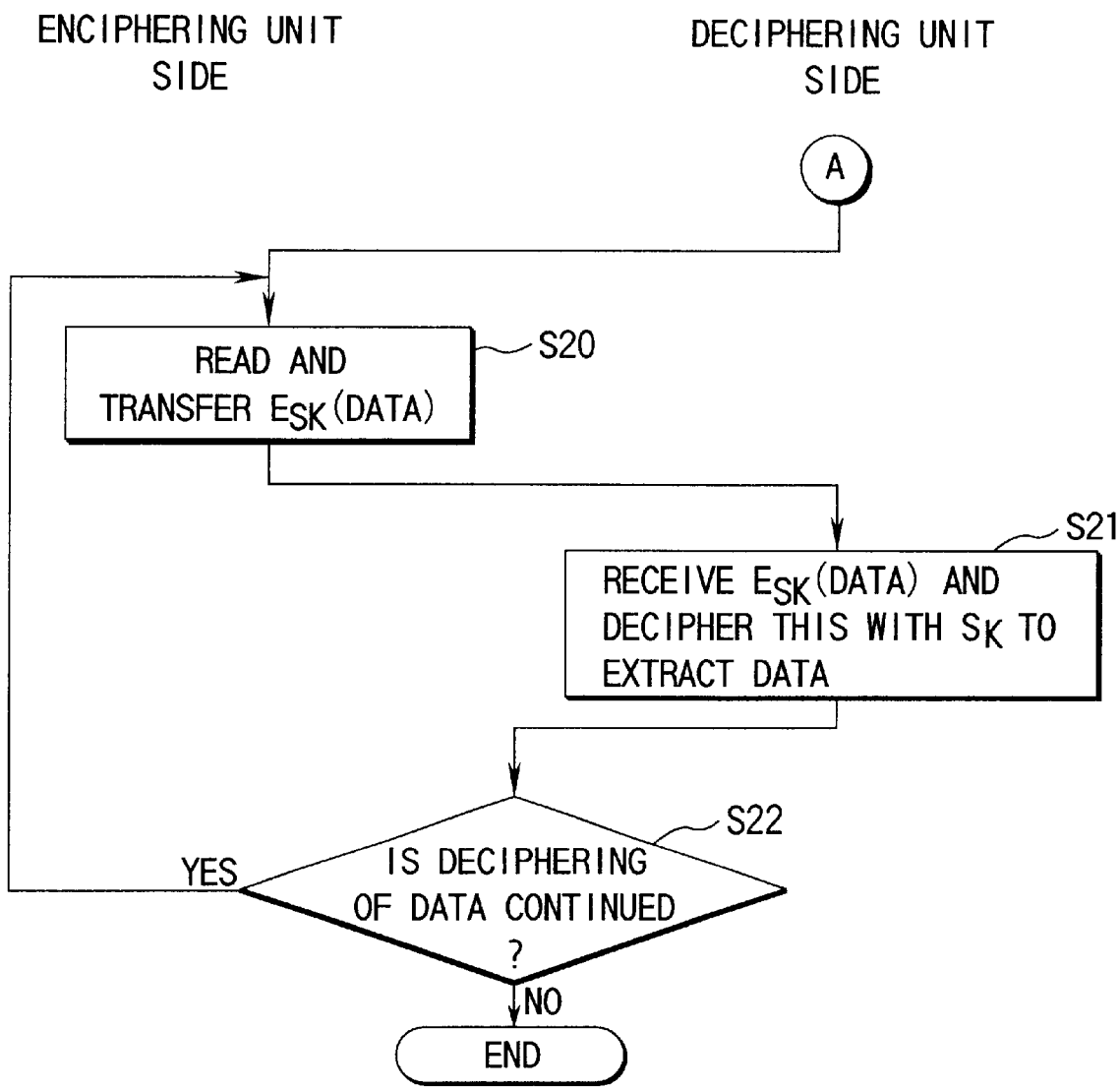
FIG. 8 is a flowchart for the operation of the second embodiment.

FIG. 5 is a block diagram of the system according to the second embodiment of the present invention. An example of the operation of the second embodiment is shown in the flowchart of FIGS. 7 and 8.

The system related to the second embodiment is connected to the CPU BUS of the CPU (not shown) used for reproduction in a computer, such as a personal computer. The system is designed to allow the enciphered data ($E_{SK}$(Data)) to flow over the CPU BUS. FIG. 5 shows only the sections related to the CPU used for reproduction.

As shown in FIG. 5, the system of the second embodiment comprises a DVD driving unit (not shown) that reads the data from a DVD 101, an enciphering unit 107 that is connected to the DVD driving unit without the CPU BUS or is built in the DVD driving unit, and a deciphering unit 114a.

The enciphering unit 107 and deciphering unit 114a are connected to the CPU BUS 110. The deciphering unit 114a outputs the data via, for example, an I/O port, not via the CPU BUS. That is, in the second embodiment, the input and output of the data is carried out without the CPU BUS, whereas the CPU BUS is used for the data transfer between the enciphering unit 107 and the deciphering unit 114a.

The enciphering unit 107 includes a demodulation/error correction circuit 117, a demodulation/error correction circuit 118, and an enciphering circuit 104. Although in FIG. 5, the enciphering unit 107 has two enciphering circuits 104, it is assumed that it actually has one enciphering circuit. The enciphering unit 107 is assumed to be composed of a single independent IC chip. The demodulation/error correction circuit 117 and demodulation/error correction circuit 118 may be provided in the unit (the DVD driving unit) in the preceding stage, not in the enciphering unit 107.

The deciphering unit 114a includes a deciphering circuit 112 and a session key creation circuit 111 that creates a second session key $S_K'$, and a key judging circuit 120.

Figure 6A:
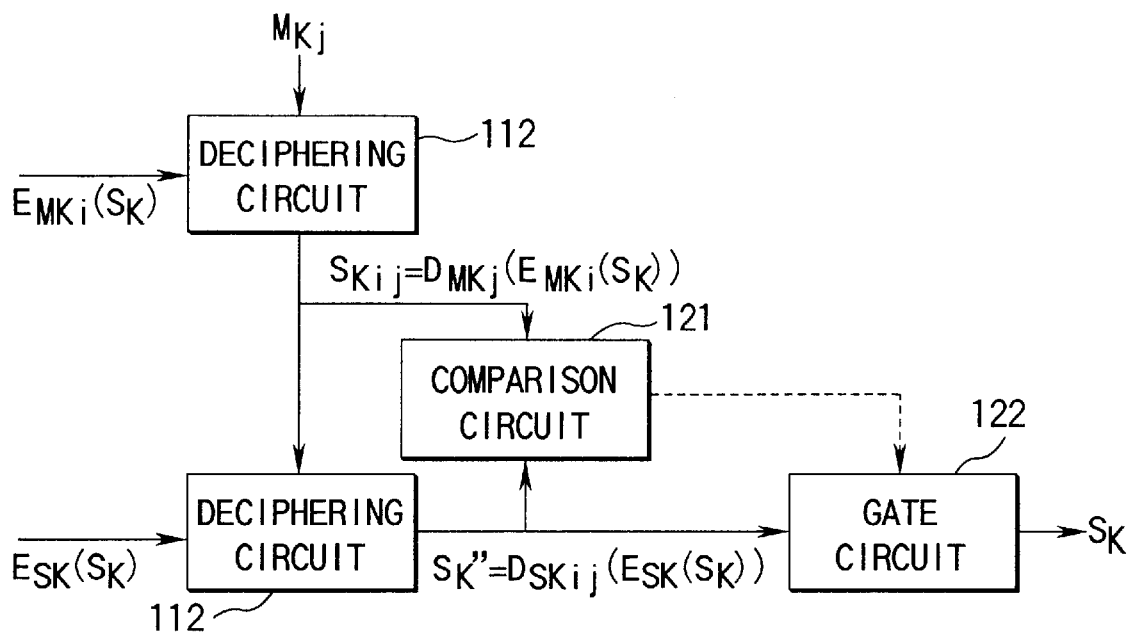
FIGS. 6A and 6B show examples of the internal structure of the key judging section.
Figure 6B:
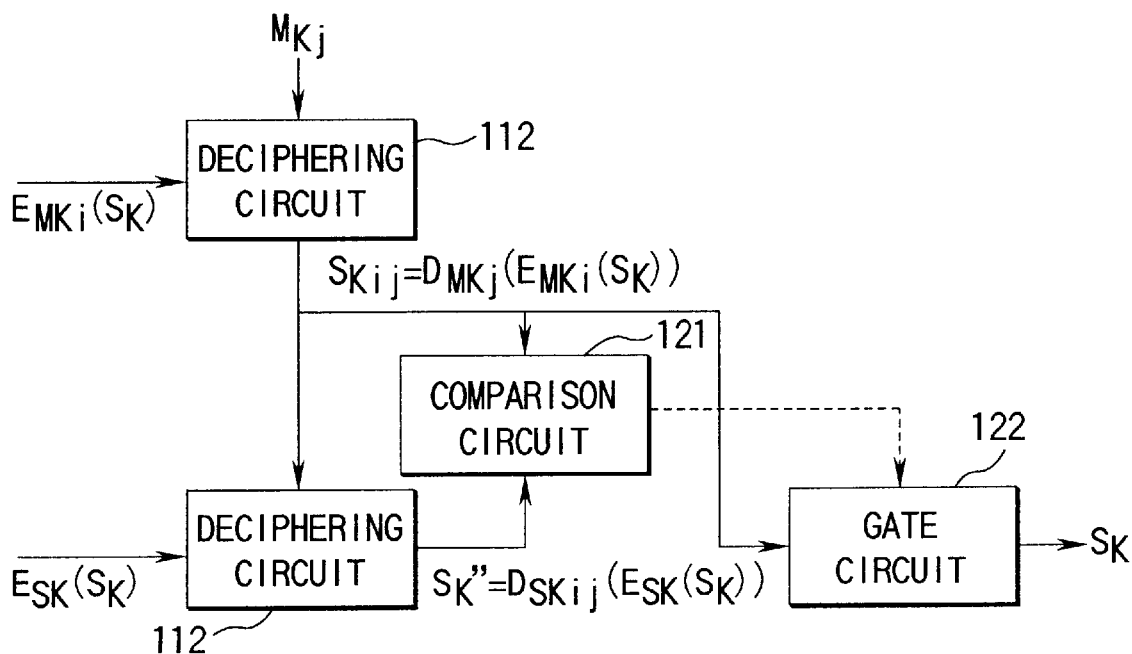

FIGS. 6A and 6B show examples of the structure of the key judging circuit 120. The key judging circuit 120 includes a deciphering circuit 112, a comparison circuit 121, and a gate circuit 122. In the second embodiment, it is assumed that the deciphering unit 114a incorporates an MPEG decoder circuit 115 and a conversion circuit 116 that converts the deciphered digital image data into analog image data.

Although in FIG. 5 and FIGS. 6A and 6B, the deciphering unit 114a has a total of five deciphering circuits 112, including the two deciphering circuits 112 in the key judging circuit 120, it is assumed that it actually has one deciphering circuit.

The deciphering unit 114a is composed of a single independent IC chip.

In each of the enciphering unit 107 and deciphering unit 114a, master keys, explained later, have been registered. It is assumed that the master keys have been recorded in a secret area in each of the enciphering unit chip and the deciphering unit chip so that the user cannot externally take out the master keys.

A control section (not shown) is assumed to control the entire system. The control section is realized by, for example, executing a program on the CPU in the computer. Concrete examples of control by the control section include an instruction to read the data from a DVD, the specification of data transfer destination, and an instruction to output the data from the deciphering unit 114a. The control section may be triggered, for example, by the user via a user interface, or by a process in an application program.

In the second embodiment, there are an n number of types of master keys. A first session key is represented by $S_K$, a second session key $S_K'$, the t-th master key $M_{Kt}$ (t is in the range of 1 to n), and image data (i.e., the data to be enciphered) Data.

In FIG. 5, numeral 102-1 indicates $E_{MKt}(S_K)$ created by enciphering the first session key $S_K$ using the master key $M_{Ki}$, 102-2 $E_{SK}(S_K)$ created by enciphering the first session key $S_K$ using the first session key $S_K$ itself, 103 $E_{SK}(Data)$ created by enciphering the image data Data using the first session key $S_K$, 105 the master key $M_{Ki}$, 106 a second session key $S_K'$, 108 $D_{MKj}(S_K')$ created by deciphering the second session key $S_K'$ using the master key $M_{Kj}$, 109-1 $E_{SK}'(E_{MKi}(S_K))$ created by enciphering the first session key $E_{MKi}(S_K)$ enciphered with the master key $M_{Ki}$ using the second session key $S_K'$, 109-2 $E_{SK}'(E_{SK}(S_K))$ created by enciphering the first session key $E_{SK}(S_K)$ enciphered with the first session key $S_K$ itself using the second session key $S_K'$ and 113 the first session key $S_K$.

Several methods can be considered as to how to set the number of types of $E_{MKi}(S_K)$ created by enciphering the first session key $S_K$ recorded on the DVD 101 using the master key $M_{Ki}$ and how to set the number of types of master key $M_{Kj}$ the deciphering unit 114a has in it. For example, they are as follows.

(Method 1) One session key $E_{MKi}(S_K)$ (i is in the range of 1 to n) is recorded on the DVD 101. The deciphering unit 114a has an n number of master keys $M_{Kj}$ (j=1 to n) in it.

(Method 2) An n number of session keys $E_{MKi}(S_K)$ (i=1 to n) are recorded on the DVD 101. The deciphering unit 114a has one master key $M_{Kj}$ (j is in the range of 1 to n) in it.

(Method 3) This is an expansion of Method 2. An n number of session keys $E_{MKi}(S_K)$ (i=1 to n) are recorded on the DVD 101. The deciphering unit 114a has an m (2<m<n) number of session keys $M_{Kj}$ (j=1 to n) in it. The m number of session keys have been selected from the n number of session keys beforehand.

As a concrete example, n=100 or n=400 and m=2, 3, 4, or 10. The present invention is not limited to these values.

(Method 4) This is the reverse of Method 3. An m (2 <m <n) number of session keys $E_{MKi}(S_K)$ (i=1 to n) are recorded on the DVD 101. The m number of master keys have been selected from an n number of master keys $M_{Kj}$ (j=1 to n) beforehand. The deciphering unit 114a has an n number of master keys $M_{Kj}$ (j=1 to n) in it.

(Method 5) An n number of session keys $E_{MKi}(S_K)$ (i=1 to n) are recorded on the DVD 101. The deciphering unit 114a has an n number of master key $M_{Kj}$ (j=1 to n) in it.

Method 3 to Method 5 have the same deciphering procedure.

As shown in FIG. 3, it is assumed that on the DVD 101, one (in the case of Method 1) or more (in the case of Method 2 to Method 5) $E_{MKi}(S_K)$ created by enciphering the first session key $S_K$ using the master key $M_{Ki}$ are recorded in the key recording area (lead-in area) in the innermost circumference portion and $E_{SK}(Data)$ created by enciphering the image data Data using the first session key $S_K$ is recorded in the data recording area (data area).

It is assumed that an n number of master keys $M_{Kj}$ (in the case of Method 1, Method 4, or Method 5), one master key $M_{Kj}$ (in the case of Method 2), or an m number of master keys $M_{Kj}$ (in the case of Method 3) have been registered in the deciphering unit 114a.

A predetermined master key is assumed to have been registered in the enciphering unit 107.

Hereinafter, Method 1, Method 2, and Method 3 to Method 5 will be explained in that order.

First, the operation of the second embodiment in the case of Method 1 will be explained by reference to the flowcharts of FIGS. 7 and 8.

At step S11, the first session key $E_{SK}(S_K)$ enciphered using the first session key $S_K$ itself is read from the DVD 101, on which the DVD driving unit (not shown) has recorded the first session key, and then is loaded into the enciphering unit 107. At that time, the demodulation/error correction circuit 117 performs demodulation and data error correction.

At step S12, the first session key $E_{MKi}(S_K)$ (i in the range of 1 to n, where i is unknown here) enciphered using the master key $M_{Ki}$ is read from the DVD 101, on which the DVD driving unit (not shown) has recorded the master key, and then is loaded into the enciphering unit 107. At that time, the demodulation/error correction circuit 117 performs demodulation and data error correction.

At step S13, the session key creation circuit 111 of the deciphering unit 114 creates a second session key $S_K'$ using random numbers, such as time data from a clock (not shown). Then, the deciphering circuit 112 deciphers the created second session key $S_K'$ using the master key $M_{Kj}$ (j is in the range of 1 to n, where j is predetermined) to create $D_{MKj}(S_K')$ and sends it to the enciphering unit 107 via the CPU BUS 110.

As the timing of generating random numbers (e.g., the timing of inputting time information), for example, the timing with which the signal indicating that the DVD 101 has been loaded into the DVD driving unit is asserted may be used.

The session creation circuit 111 may be composed of a random-number generator that is as long as the key, for example. When a key is created using random numbers all of whose bits may take 0s or is, it is necessary to perform a check process to prevent all of the bits from taking 0s or 1s.

At step S14, using the master key $M_{Kj}$ (j has a predetermined value in the range of 1 to n), the enciphering circuit 104 of the enciphering unit 107 enciphers $D_{MKj}(S_K')$ received via the CPU BUS 110.

Namely, from $E_{MKj}(D_{MKj}(S_K'))=S_{K'}$.

a second session key $S_K'$ created at the session key creation circuit 111 of the deciphering unit 114a can be obtained.

The second session key $S_K'$ created at the session key creation circuit 111 is designed to prevent its contents from being known even if it is stolen on the CPU BUS 110.

Then, at step S15, using the thus obtained second session key $S_K'$, the enciphering unit 107 enciphers the enciphered first session key $E_{SK}(S_K)$ recorded on the DVD 101 to create $E_{SK}'(E_{SK}(S_K))$, and sends this to deciphering unit 114a in via CPU BUS 110.

Similarly, at step S16, using the thus obtained second session key $S_K'$, the enciphering unit 107 enciphers the enciphered first session key $E_{MKi}(S_K)$ recorded on the DVD 101 to create $E_{SK}'(E_{MKi}(S_K))$, and sends this to deciphering unit 114a.

Then, at step S17, the deciphering circuit 112 of the deciphering unit 114a deciphers $E_{SK}'(E_{SK}(S_K))$ received via the CPU BUS 110 using the second session key $S_K'$ and produces:

$$D_{SK'}(E_{SK'}(E_{SK}(S_K)))=E_{SK}(S_K)$$

Similarly, at step S18, the deciphering circuit 112 of the deciphering unit 114a deciphers $E_{SK'}(E_{MKi}(S_K))$ received via the CPU BUS 110 using the second session key $S_K'$ and produces:

$$D_{SK'}(E_{SK'}(E_{MKi}(S_K)))=E_{MKi}(S_K)$$

Because the master key $M_{Ki}$ used in creating $E_{MKi}(S_K)$ is unknown, the first session key $S_K$ is found using the key judging circuit 120 as follows.

First, the principle of the key judging process will be explained.

When $E_{MKi}(S_K)$ is deciphered using all of the master keys $M_{Kj}$ (j=1 to n), this gives:

$$S_{Kij}=D_{MKj}(E_{MKi}(S_K)) \text{ (j=1 to n)}$$

Of these, one $S_{Kij}$ (j=1 to n) is the first session key $S_K$.
Using the $E_{SK}(S_K)$, it is determined which one of the created $S_{Kij}$ (j=1 to n) is the first session key $S_K$.

Then, when $E_{SK}(S_K)$ is deciphered using all of the candidates $S_{Kij}$ (j=1 to n) of the first session key, this gives:

$$S_K''(i, j)=D_{SKij}(E_{SK}(S_K))$$

Here, when the same master key $M_{Kj}$ as the master key $M_{Ki}$ used in creating $E_{MKi}(S_K)$ is used in the deciphering unit, or when i=j, this gives $SK''(i, j)=S_{Kij}=S_K$ Therefore, when a check is made to see if $S_K''(i, j)=S_{Kij}$ (j=1 to n) holds for each $S_{Kij}$ (j=1 to n), this gives $S_{Kij}$ that meets $S_K''(i,j)=S_{Kij}$ (j=1 to n) as the first session key $S_K$. The one corresponding to j giving the $S_{Kij}$ is the master key used in the present session.

The operation is expressed in C language notation as follows:

```
for (i=1; i<n+1; i++) {
  DS1[i]=DMK[i](EM_Ki(S_K));
  DS2[i]=DSK[i](E_SK(S_K));
  if(DS1[i]==DS2[i])
  {
    SK1=DS2[i];
    break;
  }
  else EXIT_MISMATCH;
}
```

The second line in the above procedure indicates the operation of deciphering $E_{MKi}(S_K)$ using $M_{Ki}$ and substituting the result into DS1[i].

The third line in the procedure indicates the operation of deciphering $E_{SK}(S_K)$ using $S_{Ki}$ and substituting the result into DS2[i].

The fourth line in the procedure indicates the operation of judging whether or not DS1[i] coincides with DS2[i].

The ninth line in the procedure indicates the operation executed when DS1[i] does not coincide with DS2[i].

For example, in FIGS. 6A and 6B, the deciphering circuit 112 in the key judging circuit 120 deciphers $E_{MKi}(S_K)$ for j=1 using master key $M_{Kj}$, giving:

$$S_{Kij}=D_{MKj}(E_{MKi}(S_K))$$

Then, the deciphering circuit 112 deciphers $E_{SK}(S_K)$ using $S_{Kij}$, giving:

$$S_K''=D_{SKij}(E_{SK}(S_K))$$

Next, the comparison circuit 121 compares $S_K''$ with $S_{Kij}$. If they coincide with each other, the gate circuit 122 will be controlled so as to output the stored $S_{Kij}$ (FIG. 6A) or $S_K''$ (FIG. 6B) as the first session key $S_K$.

If they do not coincide, j is incremented by one and the same operation will be carried out until the first session key $S_K$ has been obtained.

After the first session key $S_K$ has been obtained as described above, at step S20, the image data $E_{SK}(Data)$ enciphered using the first session key $S_K$ recorded on the DVD 101 by the DVD driving unit (not shown) is read out and loaded into the enciphering unit 107. At that time, the demodulation/error correction circuit 118 performs demodulation and corrects errors in the data. Then, $E_{SK}(Data)$ is sent to the enciphering unit 107 via the CPU BUS 110.

At step S21, the deciphering circuit 112 of the deciphering unit 114a deciphers $E_{SK}(Data)$ received via the CPU BUS 110 using the first session key $S_K$ and produces:

$$D_{SK}(E_K(Data))=Data$$

Then, the enciphered image data is deciphered to produce Data.

Then, step S20 and step S21 are repeated until for example, the process of the data to be deciphered (i.e., $E_{SK}(Data)$) has been completed or the stop of the process has been requested.

When the image data Data thus obtained has been compressed according to, for example, the MPEG2 data compression standard, the image data is decoded at an MPEG decoder circuit 115. After the decoded signal has been converted by a D/A converter circuit 116 into an analog signal, the analog signal is sent to an imaging device (not shown), such as a television, which reproduces the image.

Any one of step S11, step S12, and steps S13 and S4 may be executed first.

Moreover, either step S15 and step S17 or step S16 and S18 may be executed first.

Step S20 and step S21 may be executed by the method of carrying out the steps in units of $E_{SK}(Data)$, the method of reading a specific number of $E_{SK}(Data)$ at step S20, storing the read-out data in a buffer temporarily, and then deciphering $E_{SK}(Data)$ in the buffer at step S21, or the method of carrying out step S20 and step S21 in a pipeline processing manner.

Moreover, the deciphering circuit 112 may transfer the image data $E_{SK}(Data)$ to the MPEG decoder circuit 115 in units of one Data item or a specific number of Data items.

As described above, with the second embodiment, even when the data flowing over the CPU BUS 110 is stored, the data cannot be reproduced or used, as in the first embodiment.

As a result, the wrongful conduct of making unauthorized copies and selling the thus copied mediums can be prevented, thereby protecting copyrights.

Furthermore, with the second embodiment, the information that directly indicates the master key used to encipher the first session key recorded on the recording medium is not necessary, which enables a suitable master key to be selected and used in a predetermined range in recording the data on a DVD. In addition, the second embodiment has the advantage that it can allocate master keys in a specific unit, such as a DVD maker or a DVD distributor.

With the second embodiment, because the circuits used for enciphering and deciphering can be designed separately from the essential portion of the reproducing section of the digital recording and reproducing apparatus, such as a DVD, even if the cipher is broken, the deciphering unit 114a (or the enciphering unit 107 and deciphering unit 114a) has only to be replaced to overcome this problem.

While in the second embodiment, the enciphering unit 107 has one enciphering circuit, it may have two enciphering circuits. Moreover, although in the embodiment, deciphering unit 114a has one deciphering circuit, it may have two, three, four, or five deciphering circuits. In these cases, it is desirable that the enciphering circuits should be paired with the corresponding deciphering circuits and each pair be used independently.

When a set of an enciphering circuit and its corresponding deciphering circuit is used independently, an enciphering method different from that in another enciphering circuit and deciphering circuit may be used in the enciphering circuit and its corresponding deciphering circuit in the independent set.

Next, the operation of the second embodiment in the case of Method 2 where an n number of $E_{MKi}(S_K)$ (i=1 to n) have been recorded on the DVD 101 and the deciphering unit 114a includes one $M_{Kj}$ (j has a value in the range of 1 to n) will be explained by reference to the flowcharts of FIGS. 7 and 8.

At step S11, the first session key $E_{SK}(S_K)$ enciphered using the first session key $S_K$ itself is read from the DVD 101, on which the DVD driving unit (not shown) has recorded the first session key, and then is loaded into the enciphering unit 107. At that time, the demodulation/error correction circuit 117 performs demodulation and data error correction.

At step S12, the first session key $E_{MKi}(S_K)$ (i=1 to n) enciphered using the master key $M_{Ki}$ is read from the DVD 101, on which the DVD driving unit (not shown) has recorded the master key, and then is loaded into the enciphering unit 107. At that time, the demodulation/error correction circuit 117 performs demodulation and data error correction.

At step S13, the session key creation circuit 111 of deciphering unit 114a creates a second session key $S_K'$ using random numbers, such as time data from a clock (not shown). Then, the deciphering circuit 112 deciphers the created second session key $S_K'$ using the master key $M_{Kj}$ (j has a predetermined value in the range of 1 to n) to create $D_{MKj}(S_K')$ and sends it to the enciphering unit 107 via the CPU BUS 110.

As for the timing of generating random numbers (e.g., the timing of inputting time information), for example, the timing with which the signal indicating that the DVD 101 has been loaded into the DVD driving unit is asserted may be used.

At step S14, using the master key $M_{Kj}$ (j has a predetermined value in the range of 1 to n), the enciphering circuit 104 of the enciphering unit 107 enciphers $D_{MKj}(S_K')$ received via the CPU BUS 110.

Namely, from $E_{MKj}(D_{MKj}(S_K'))=S_K'$
a second session key $S_K'$ created at the session key creation circuit 111 of the deciphering unit 114a can be obtained.

The second session key $S_K'$ created at the session key creation circuit 111 is designed to prevent its contents from being known even if it is stolen on the CPU BUS 110.

Then, at step S15, using the thus obtained second session key $S_K'$, the enciphering unit 107 enciphers the enciphered first session key $E_{SK}(S_K)$ recorded on the DVD 101 to create $E_{SK'}(E_{SK}(S_K))$, and sends this to deciphering unit 114a.

Similarly, at step S16, using the thus obtained second session key $S_K'$, the enciphering unit 107 enciphers an n number of enciphered first session keys $E_{MKi}(S_K)$ recorded on the DVD 101 to create $E_{SK'}(E_{MKi}(S_K))$, and sends these to deciphering unit 114a via the CPU BUS 110.

Then, at step S17, the deciphering circuit 112 of the deciphering unit 114a deciphers $E_{SK'}(E_{SK}(S_K))$ received via the CPU BUS 110 using the second session key $S_K'$ and produces:

$$D_{SK'}(E_{SK'}(E_{SK}(S_K)))=E_{SK}(S_K)$$

Similarly, at step S18, the deciphering circuit 112 of the deciphering unit 114a deciphers $E_{SK'}(E_{MKi}(S_K))$ received via the CPU BUS 110 using the second session key $S_K'$ and produces:

$$D_{SK'}(E_{SK'}(E_{MKi}(S_K)))=E_{MKi}(S_K)$$

Because the master key $M_{Ki}$ used in creating each of the n number of $E_{MKi}(S_K)$ (i=1 to n) recorded on the DVD 101 is unknown, it cannot be known whether the master key $M_{Ki}$ corresponds to the master key $M_{Kj}$ in the deciphering unit 114a. At step S19, the first session key $S_K$ is found using the key judging circuit 120 as follows.

First, the principle of the key judging process will be explained.

When all of $E_{MKi}(S_K)$ (i=1 to n) are deciphered using the master key $M_{Kj}$, this gives:

$$S_{Kij} = DM_{Kj}(E_{MKi}(S_K)) \ (i=1 \ to \ n)$$

Of these, one $S_{Kij}$ (i is in the range of 1 to n) is the first session key $S_K$.

Using the $E_{SK}(S_K)$, it is determined which one of the created $S_{Kij}$ (i=1 to n) is the first session key $S_K$.

Then, when $E_{SK}(S_K)$ is deciphered using all of the candidates $S_{Kij}$ (i=1 to n) of the first session key, this gives:

$$S_{K''(i, \ j)} = D_{SKij}(E_{SK}(S_K))$$

Here, when the same master key $M_{Kj}$ as the master key $M_{Ki}$ used in creating $E_{MKi}(S_K)$ is used in the deciphering unit, or when i=j, this gives $S_{K'}(i, j) = S_{Kij} = S_K$.

Therefore, when a check is made to see if $S_{K''}(i, j) = S_{Kij}$ (j=1 to n) holds for each $S_{Kij}$ (i=1 to n), this gives $S_{Kij}$ that meets $S_{K''}(i, j) = S_{Kij}$ (j=1 to n) as the first session key $S_K$. The one corresponding to i giving the $S_{Kij}$ is the master key used in the present session.

For example, in FIGS. 6A and 6B, the deciphering circuit 112 in the key judging circuit 120 deciphers $E_{MKi}(S_K)$ for i=1 using master key $M_{Kj}$, giving:

$$S_{Kij} = D_{MKj}(E_{MKi}(S_K))$$

Then, the deciphering circuit 112 deciphers $E_{SK}(S_K)$ using $S_{Kij}$, giving:

$$S_{K''} = D_{SKij}(E_{SK}(S_K))$$

Next, the comparison circuit 121 compares $S_{K'}$ with $S_{Kij}$. If they coincide with each other, the gate circuit 122 will be controlled so as to output the stored $S_{Kij}$ (FIG. 6A) or $S_{K'}$ (FIG. 6B) as the first session key $S_K$.

If they do not coincide, i is incremented by one and the same operation will be carried. This will be continued until the first session key $S_K$ has been obtained.

After the first session key $S_K$ has been obtained as described above, at steps S20 to S22, the image data Data is extracted from the image data $E_{SK}$(Data) enciphered using the first session key $S_K$.

As described earlier, the image data Data is decoded at the MPEG decoder circuit 115. After the decoded signal has been converted by the D/A converter circuit 116 into an analog signal, the analog signal is sent to the imaging device (not shown), such as a television, which reproduces the image.

In Method 2, too, any one of step S11, step S12, and step S13 and step S14 may be executed first.

Moreover, either step S15 and step S17 or step S16 and S18 may be executed first.

Furthermore, steps S12, S16, S18, and S19 may be executed in a batch processing manner using all the n number of (enciphered) master keys recorded on the DVD or using a specific number of master keys at a time. They may be executed one after another for each master key.

When they are executed sequentially every third master key, the second session key $S_K'$ may be created for each master key.

Step S20 and step S21 may be executed by the method of carrying out the steps in units of $E_{SK}(Data)$, the method of reading a specific number of $E_{SK}(Data)$ at step S20, storing the read-out data in a buffer temporarily, and then deciphering $E_{SK}(Data)$ in the buffer at step S21, or the method of carrying out step S20 and step S21 in a pipeline processing manner.

Moreover, the deciphering unit 114a may transfer the image data $E_{SK}(Data)$ to the MPEG decoder circuit 115 in units of one Data item or a specific number of Data items.

As described above, with the second embodiment, even when the data flowing over the CPU BUS 110 is stored, the data cannot be reproduced or used, as in the first embodiment.

As a result, the wrongful conduct of making unauthorized copies and selling the thus copied mediums can be prevented, thereby protecting copyrights.

Furthermore, with the second embodiment, because the first session keys enciphered using more than one master key and the first session key enciphered with the first session key itself are stored on the recording medium, the master keys built in the deciphering unit can be allocated in a specific unit, such as to each unit manufacturer.

With the second embodiment, because the circuits used for enciphering and deciphering can be designed separately from the essential portion of the reproducing section of the digital recording and reproducing apparatus, such as a DVD, as seen from FIG. 1, even if the cipher is broken, the deciphering unit 114b (or the enciphering unit 107 and deciphering unit 114b) has only to be replaced to overcome this problem.

While in the second embodiment, the enciphering unit 107 has one enciphering circuit, it may have two enciphering circuits. Moreover, although in the embodiment, the deciphering unit 114a has one deciphering circuit, it may have two, three, four, or five deciphering circuits. In these cases, it is desirable that the enciphering circuits should be paired with the corresponding deciphering circuits and each pair be used independently or be shared.

When a set of an enciphering circuit and its corresponding deciphering circuit is used independently, an enciphering method different from that in another enciphering circuit and deciphering circuit may be used in the enciphering circuit and its corresponding deciphering circuit in the independent set.

Next, explanation will be given about Method 3 where an n number of $E_{MKi}(S_K)$ (i=1 to n) have been recorded on the DVD 101 and the deciphering unit 114a includes an m number of $M_{Kj}$ (j takes m values in the range of 1 to n (m<n)).

Since Method 3 is the same as Method 2 in basic configuration, operation, and effect, only the difference between them will be explained.

While in Method 2, the deciphering unit 114a includes one predetermined master key $M_{Kj}$ (j has a value in the range of 1 to n), in Method 3, the deciphering unit 114a includes an m number of predetermined master keys $M_{Kj}$ (m $\geq$2). The order in which the m number of master keys $M_{Kj}$ (j takes m values in the range of 1 to n) are used in the key judgment has been determined.

Because an n number of $E_{MKi}(S_K)$ (i=1 to n) have been recorded on the DVD 101, using the master key first in order of use in the deciphering unit 114b produces the first session key $S_K$. Therefore, in this case, the operation is the same as in Method 2.

With Method 3, if one of the master keys is broken, the master key is made unusable. From this time on, $E_{MKi}(S_K)$ corresponding to the unusable master key is not allowed to be recorded on the DVD 101. This case will be explained below.

When the unusable master key is not the master key first in order of use, the first session key $S_K$ can be obtained. In this case, too, the operation is the same as in Method 2.

When the master key first in order of use is made unusable, $E_{MKi}(S_K)$ corresponding to the unusable master key has not been recorded on the DVD 101. Even if the master key first in order of use is used, the first session key $S_K$ cannot be obtained in step S19. In such a case, when the deciphering unit 114a carries out the same operation using the master key second in order of use as in Method 2, this produces the first session key $S_K$, provided that this master key is not unusable.

Even when the master key r-th in order of use is made unusable, the first session key $S_K$ can be obtained similarly, provided that one of the master keys (r+1)-th or later in order of use is not unusable.

In this way, the deciphering unit 114a can be used until the predetermined m number of master keys (m$\geq$2) in the deciphering unit 114a have all been made unusable.

The operation of Method 5 is the same as that of Method 3.

Because in Method 4, the information corresponding to all the master keys has not been stored on the DVD 101, when the information corresponding to the master key selected in the deciphering unit has not been recorded on the DVD 101, deciphering cannot be effected as in the case where the master key is unusable. In this case, the master key next in order of use is selected and deciphering is tried. Therefore, the operation of Method 4 is also the same as that of Method 3.

In the embodiment, to encipher the information and transfer it safely over the CPU BUS 110, the second session key $S_K'$ has been used. The second session key $S_K'$ is created in the deciphering unit 114a and is transferred to the enciphering unit 107 through the procedure of using master keys. At that time, one predetermined master key is supposed to have been registered in the enciphering unit 107.

Instead, a plurality of master keys may be registered in the enciphering unit 107 and the second session key $S_K'$ may be transferred from the deciphering unit 114a to the enciphering unit 107, using the procedure as described in Method 1 to Method 5 using key judgment.

For example, when the same master keys as that registered in the deciphering unit 114a is also registered in the enciphering unit 107, the operation is the same as that of Method 5.

When part of the master keys registered in the deciphering unit 114a are registered in the enciphering unit 107, the operation is the same as that of Method 3.

When one master key is registered in the enciphering unit 107, the procedure of Method 2 can be used.

In these cases, however, in the procedure of each of Method 1 to Method 5, enciphering is replaced with deciphering. Specifically, $D_{MKj}(S_{K'})$ and $D_{SK}'(S_K)$ are transferred from the deciphering unit 114a to the enciphering unit 107.

In addition to the configuration using the master key, various suitable configurations may be used as the configuration that safely transfers the second session key $S_K'$ from the deciphering unit 114a to the enciphering unit 107 over the CPU BUS 110, such as the techniques disclosed in Nikkei Electronics, No. 676, Nov. 18, 1996, pp. 13–14. In this case, it is not necessary to register a master key in the enciphering unit 107.

Third Embodiment

Hereinafter, a third embodiment of the present invention will be explained.

The third embodiment is, for example, a single DVD player.

Figure 9:
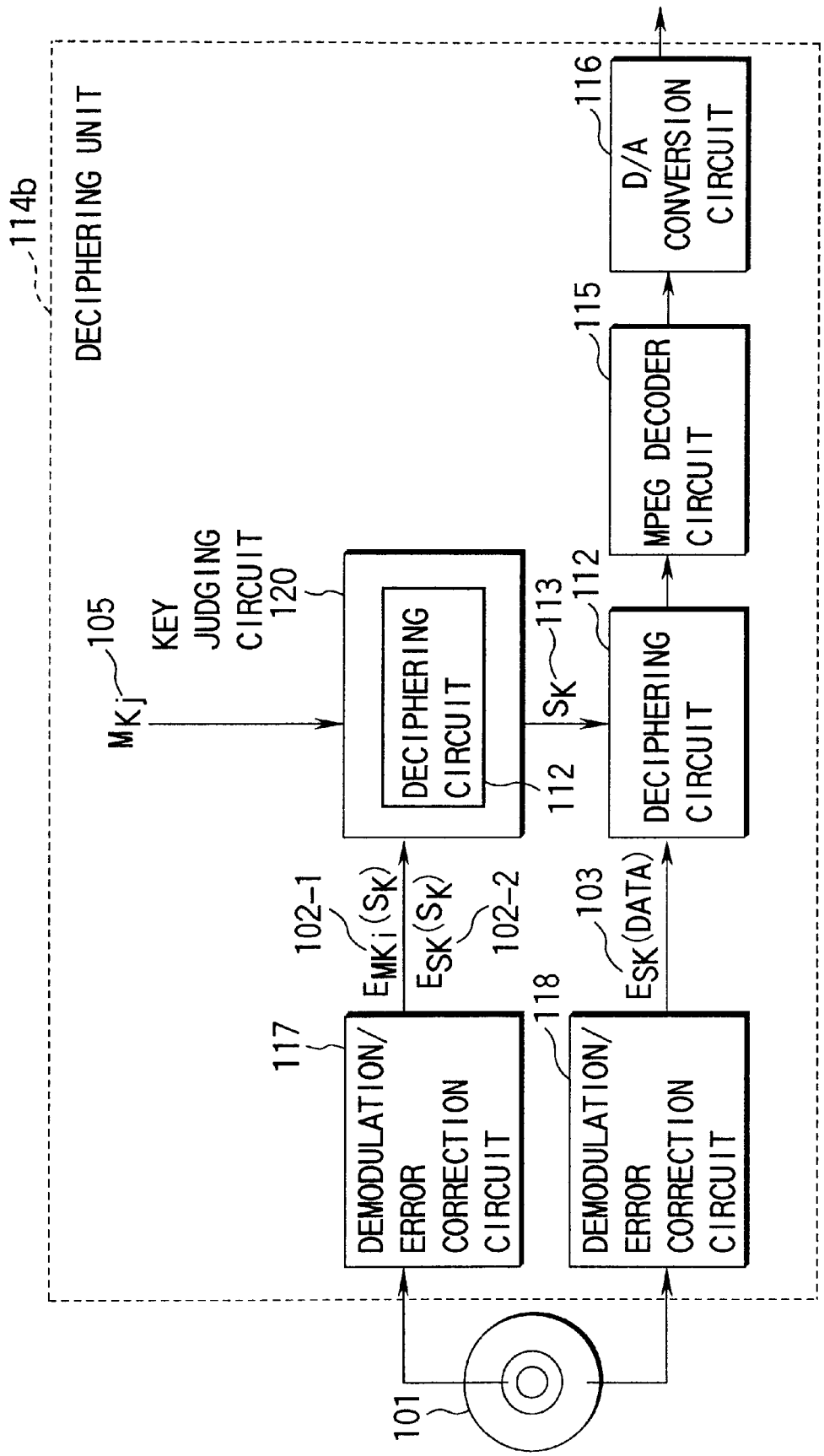
FIG. 9 is a block diagram of a system according to a third embodiment of the present invention.
Figure 10:
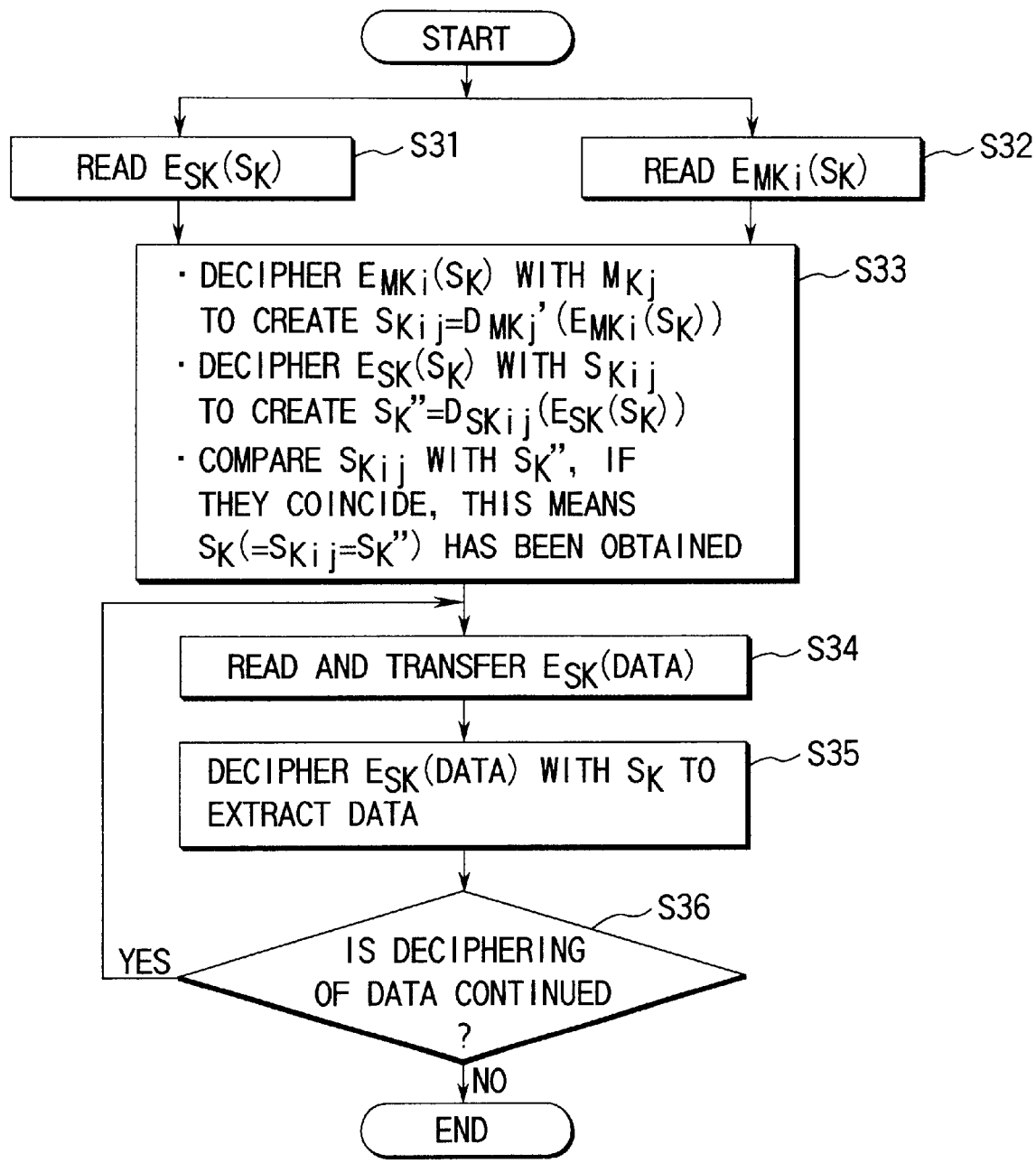
FIG. 10 is a flowchart for the operation of the third embodiment.

FIG. 9 is a block diagram of a system according to the third embodiment of the present invention. An example of the operation of the third embodiment is shown in the flowchart of FIG. 10.

The third embodiment is what is obtained by eliminating from the configuration of the second embodiment the portion related to the operation of exchanging an enciphered key between the enciphering unit and deciphering unit by use of the second session key.

As shown in FIG. 9, the system of the third embodiment comprises a DVD driving unit (not shown) that reads the data from a DVD 101 and a deciphering unit 114b.

The deciphering unit 114b includes a deciphering circuit 112, a key judging circuit 120, a demodulation/error correction circuit 117, and a demodulation/error correction circuit 118. In the third embodiment, the deciphering unit 114b is assumed to include an MPEG decoder circuit 115 and a conversion circuit 116 that converts the digital deciphered data into analog data.

As shown in FIGS. 6A and 6B, the key judging circuit 120 includes a deciphering circuit 112, a comparison circuit 121, and a gate circuit 122.

Although in FIG. 9 and FIGS. 6A and 6B, the deciphering unit 114b has a total of three deciphering circuits 112, including the two deciphering circuits 112 in the key judging circuit 120, it is assumed that it actually has one deciphering circuit. Each of the demodulation/error correction circuit 117 and the demodulation/error correction circuit 118 may be provided in the unit in the preceding stage, not in the enciphering unit 107.

The deciphering unit 114b is composed of a single independent IC chip.

In the deciphering unit 114b, a master key, explained later, has been registered. It is assumed that the master key has been recorded in a secret area in the deciphering unit chip so that the user cannot externally take out the master key.

In the third embodiment, there are an n number of master keys. A first session key is represented by $S_K$, a second session key $S_K'$, the i-th master key $M_{Ki}$ (i is in the range of 1 to n), and image data (i.e., the data to be enciphered) Data.

In FIG. 9, numeral 102-1 indicates $E_{MKi}(S_K)$ created by enciphering the first session key $S_K$ using the master key $M_{Ki}$, 102-2 $E_{SK}(S_K)$ created by enciphering the first session key $S_K$ using the first session key $S_K$ itself, 103 $E_{SK}$(Data) created by enciphering the image data Data using the first session key $S_K$, 105 the master key $M_{Ki}$, and 113 the first session key $S_K$.

As in the second embodiment, several methods can be considered as to how to set the number of types of $E_{MKi}(S_K)$ created by enciphering the first session key $S_K$ recorded on the DVD 101 using the master key $M_{Ki}$ and how to set the number of types of master key $M_{Kj}$ the deciphering unit 114b has in it. For example, they are as follows.

(Method 1) One master key $E_{MKi}(S_K)$ (i is in the range of 1 to n) is recorded on the DVD 101. The deciphering unit 114b has an n number of master keys $M_{Kj}$ (j=1 to n) in it.

(Method 2) An n number of master keys $E_{MKi}(S_K)$ (i=1 to n) are recorded on the DVD 101. The deciphering unit 114b has one master key $M_{Kj}$ (j has a value in the range of 1 to n) in it.

(Method 3) An n number of master keys $E_{MKi}(S_K)$ (i=1 to n) are recorded on the DVD 101. The deciphering unit 114b has an m (2<m<n) number of master keys $M_{Kj}$ (j is in the range of 1 to n) in it.

(Method 4) An m (2<m<n) number of master keys $E_{MKi}(S_K)$ (i is in the range of 1 to n) are recorded on the DVD 101. The deciphering unit 114b has an n number of master keys $M_{Kj}$ (j=1 to n) in it.

(Method 5) An n number of master keys $E_{MKi}(S_K)$ (i=1 to n) are recorded on the DVD 101. The deciphering unit 114b has an n number of master key $M_{Kj}$ (j=1 to n) in it.

As shown in FIG. 3, it is assumed that on the DVD 101, one (in the case of Method 1) or more (in the case of Method 2 to Method 5) $E_{MKi}(S_K)$ created by enciphering the first session key $S_K$ using the master key $M_{Ki}$ are recorded in the key recording area (lead-in area) in the innermost circumference portion and the $E_{SK}$(Data) created by enciphering the image data Data using the first session key $S_K$ is recorded in the data recording area (data area).

Next, the operation of the third embodiment will be explained by reference to the flowchart of FIG. 10. The operation of the third embodiment is what is obtained by eliminating from the operation of the second embodiment the portion related to the operation of exchanging an enciphered key between the enciphering unit and deciphering unit by use of the second session key.

At step S31, the first session key $E_{SK}(S_K)$ enciphered using the first session key $S_K$ itself is read from the DVD 101, on which the DVD driving unit (not shown) has recorded the first session key, and then is loaded into the deciphering unit 114b. At that time, the demodulation/error correction circuit 117 performs demodulation and data error correction.

At step S32, the first session key $E_{MKi}(S_K)$ enciphered using the master key $M_{Ki}$ is read from the DVD 101, on which the DVD driving unit (not shown) has recorded the master key, and then is loaded into the deciphering unit 114b. At that time, the demodulation/error correction circuit 117 performs demodulation and data error correction.

At step S33, the first session key $S_K$ is obtained using the key judging circuit 120.

The operation of obtaining the first session key $S_K$ differs depending on Method 1, Method 2, or Method 3 to Method 5. Each case is the same as explained in the second embodiment, so explanation of them will not be given.

After the first session key $S_K$ has been obtained, the image data Data is extracted from the enciphered image data $E_{SK}$(Data) using the first session key $S_K$ at steps S34 to S36. The operation at step S34 to S36 are the same as that of steps S20 to S22 explained in the second embodiment (i.e., that of steps S6 to S8 explained in the first embodiment) except that there is no exchange of the image data Data between the units via the CPU BUS.

As described earlier, the image data Data is decoded at the MPEG decoder circuit 115. After the decoded signal has been converted by the D/A converter circuit 116 into an analog signal, the analog signal is sent to the imaging device (not shown), such as a television, which reproduces the image.

In Method 3, too, step S31 may be executed before step S32 or vice versa.

Furthermore, in method 2 and in method 3 to method 5, step S32 and step S33 may be executed in a batch processing manner using all the n number of (enciphered) master keys (in the case of Methods 2, 3, and 5) or all the m number of (enciphered) master keys (in the case of Method 4) recorded on the DVD or using a specific number of master keys at a time. They may be executed one after another for each master key.

Step S34 and step S35 may be executed by the method of carrying out the steps in units of $E_{SK}(Data)$, the method of reading a specific number of $E_{SK}(Data)$ at step S34, storing the read-out data in a buffer temporarily, and then deciphering $E_{SK}(Data)$ in the buffer at step S35, or the method of carrying out step S34 and step S35 in a pipeline processing manner.

Moreover, the deciphering unit 114b may transfer the image data $E_{SK}(Data)$ to the MPEG decoder circuit 115 in units of one Data item or a specific number of Data items.

With the third embodiment, the wrongful conduct of making unauthorized copies and selling the thus copied mediums can be prevented, thereby protecting copyrights.

Furthermore, with the third embodiment, it is possible to select and use a suitable master key in a predetermined range in recording the data on a DVD. The master keys can be allocated in a specific unit, such as to a DVD player maker, a DVD maker, or a DVD distributor.

Still furthermore, with the third embodiment, because the circuits used for enciphering and deciphering can be designed separately from the essential portion of the reproducing section of the digital recording and reproducing apparatus, such as a DVD, as seen from FIG. 1, even if the cipher is broken, the deciphering unit 114b has only to be replaced to overcome this problem.

While in the third embodiment, the deciphering unit 114b has one deciphering circuit, it may have two or three deciphering circuits. In these cases, it is desirable that the enciphering circuits should be paired with the corresponding deciphering circuits and each pair be used independently or be shared.

When a set of an enciphering circuit and its corresponding deciphering circuit is used independently, an enciphering method different from that in another enciphering circuit and deciphering circuit may be used in the enciphering circuit and its corresponding deciphering circuit in the independent set.

Until now, the first embodiment, the second embodiment (specifically, the three types of configuration), and the third embodiment (specifically, the three types of configuration) have been explained. The present invention is not limited to these embodiments, but may be practiced or embodied in still other ways without departing from the spirit or essential character thereof.

Although the embodiments have been explained using a DVD as information recording medium, the present invention may be applied to other recording mediums, such as CD-ROMs.

While in the embodiments, the image data has been used as the information to be deciphered, the present invention may be applied to reproducing devices of other types of information, such as sound, text, or programs.

While in the embodiments, the data Data is image data, the configuration may be designed to use key information $S_{Kt}$ as the data Data. Specifically, $E_{SK}(S_{Kt})$ and $E_{SKt}(Data)$ may be recorded on a recording medium, such as a DVD, beforehand in place of $E_{SK}(Data)$, then $S_{Kt}$ is first obtained at the deciphering units 114, 114a, 114b through the procedure in each of the embodiments, and $E_{SKt}(Data)$ is deciphered using the $S_{Kt}$ to produce the actual contents of the data. The hierarchization of keys may be carried out over any number of levels of hierarchy.

While in the embodiments, the information to be deciphered has been compressed according to the MPEG2 standard, the present invention is not restricted to this. The data may be compressed or enciphered according to another standard. In this case, a decoder circuit corresponding to another standard has to be provided instead of the MPEG decoder circuit 115. The data may not be enciphered. In this case, the MPEG decoder circuit 115 is eliminated.

To output any data items compressed by various methods (or data items requiring no deciphering), several types of decoder circuits may be provided and switched suitably. In this case, a method can be considered which reads an identifier indicating the decoder to be used from a recording medium, such as a DVD, and selects a suitable decoder circuit according to the identifier.

The configurations of the key judging circuit 120 shown in FIGS. 6A and 6B in the second and third embodiments are illustrative and not restrictive. Other configurations of the key judging circuit may be considered.

Various types of the configuration that uses $_{SK}(S_K)$ as key judgment information may be considered. For instance, $DSK(S_K)$ is used as information used for key judgment. The key judging circuit 120 deciphers $E_{MKi}(S_K)$ read from a recording medium, such as a DVD, using master key $M_{Kj}$ to produce $S_{Kij}=D_{MKj}(E_{MKi}(S_K))$, deciphers the $S_{Kij}$ using the $S_{Kij}$ itself to produce $S_K'''=D_{SKij}(S_{Kij})$, and compares the $S_K''$ with $D_{SK}(S_K)$ read from a recording medium, such as a DVD. When they coincide with each other, the key judging circuit judges that the first session key $S_K=S_{Kij}$ is correct and outputs it.

As other examples of key judgment information, the one enciphered or deciphered twice or more times, such as $E_{SK}(E_{SK}(S_K))$ or $D_{SK}(D_{SK}(S_K))$ may be considered. In addition, $E_{MKi}(E_{MKi}(S_K))$ may be provided for each $E_{MKi}(S_K)$.

In the embodiments, on the basis of the key judgment information, a judgment is made through the procedure shown in each of Method 1 to Method 5 as to whether the key obtained by deciphering is the correct first session key. However, the key judgment information, key judging procedure, and the structure for key judgment can be eliminated by recording all the $E_{MKi}(S_K)$ on a recording medium, such as a DVD, in order of i and registering them in the deciphering unit in such a manner that i corresponds to $M_{Ki}$. When $M_{Ki}$ for a certain i becomes unusable, it is desirable that information indicating invalidity should be stored on a recording medium, such as a DVD, in place of $E_{MKi}(S_K)$.

Figure 11:
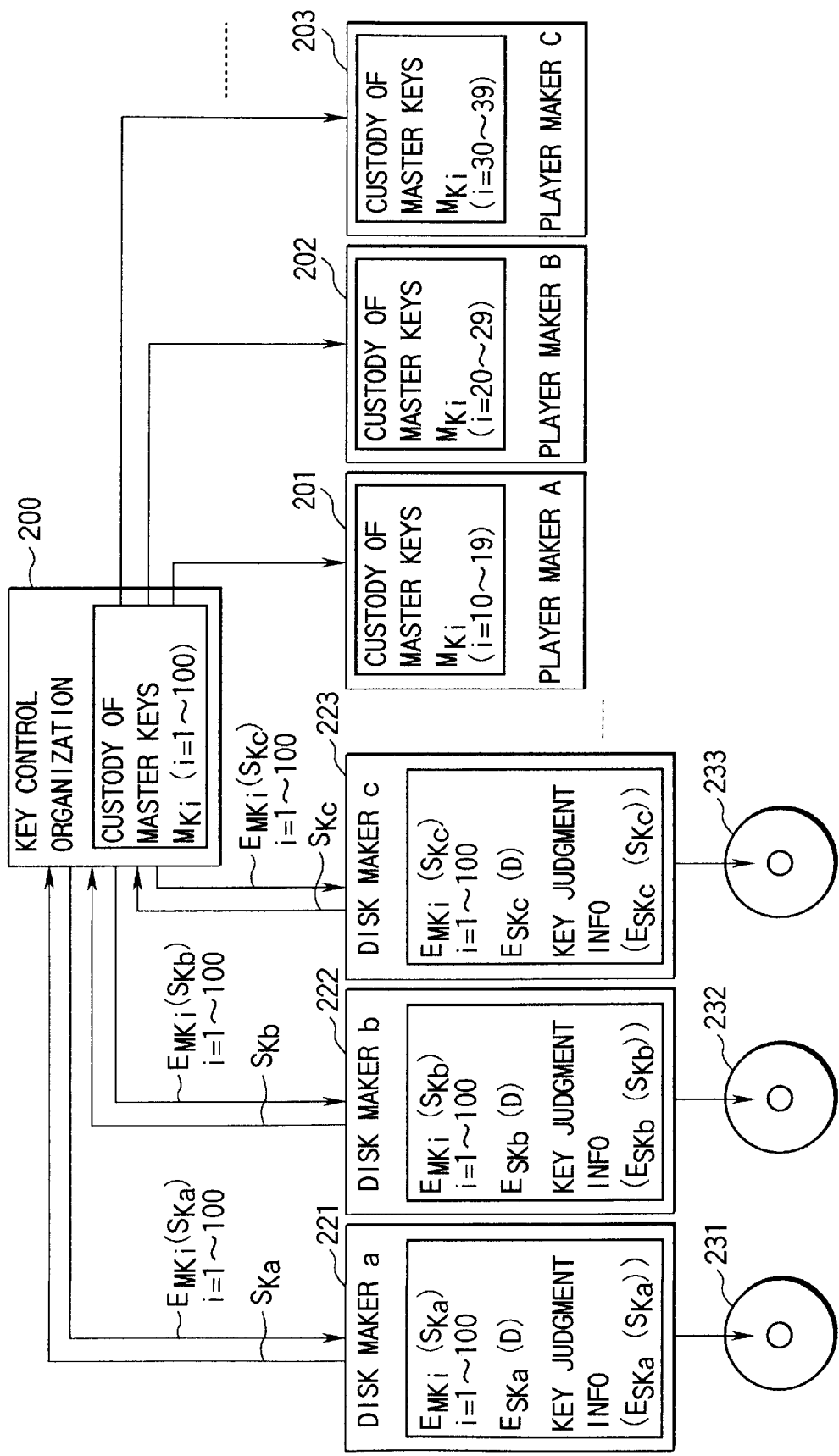
FIG. 11 is a diagram to help explain the key control method.

A key control method followed by disk makers (assumed to be makers that produce DVDs for writings, including movies and music), player makers (assumed to be makers that produce DVD players), and a key control organization that controls master keys will be described taking a DVD-ROM as example, by reference to FIG. 11. Here, in addition to the contents, Data may be key information, as described earlier (explanation of the case where enciphering or deciphering is done using key information $S_{Kt}$ when Data is key information $S_{Kt}$ will be omitted). In FIG. 11, a computer used for processing is not shown.

Figure 12:
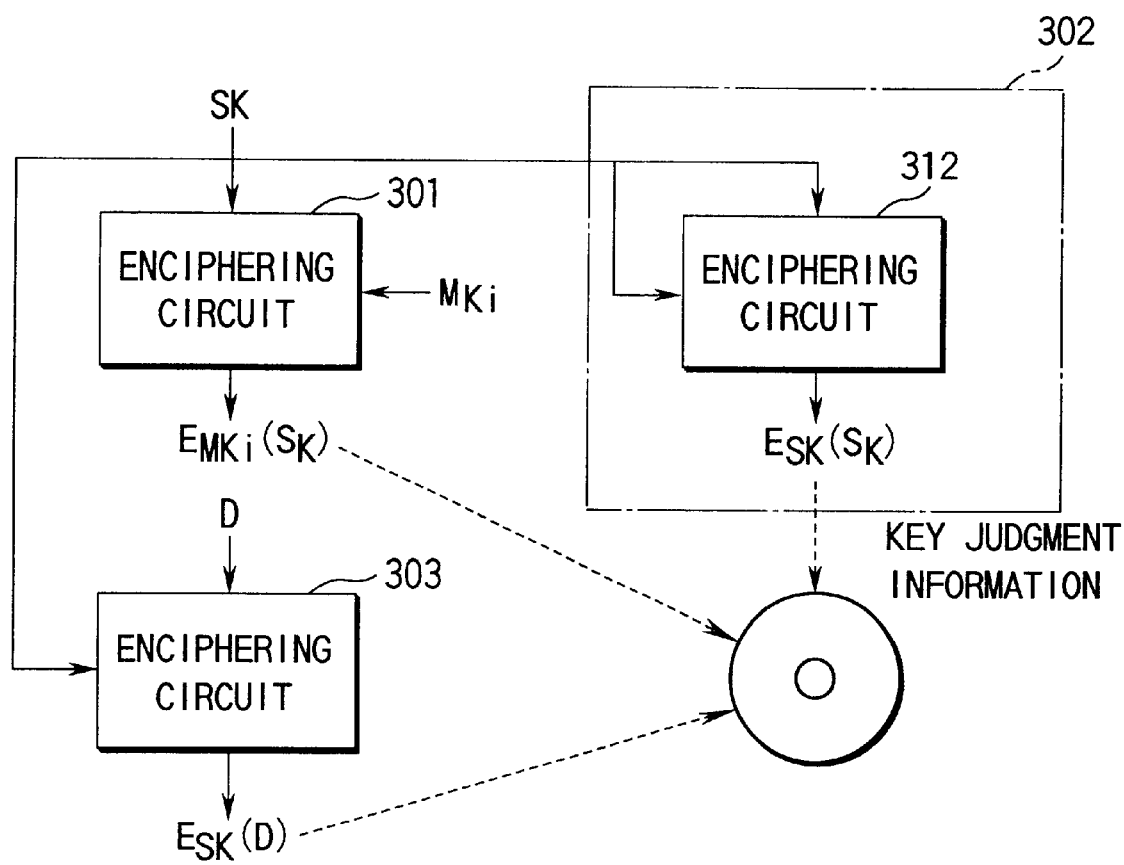
FIG. 12 is a diagram to help explain the enciphering operation.

FIG. 12 is a diagram to help explain a system for deciphering. Enciphering circuits 301, 312, 303 in FIG. 12 may be on the same unit (e.g., a computer) or on different units (e.g., computers). In the latter case, information is exchanged between the units. The enciphering circuits 301, 312, 303 may be constructed in hardware or in software.

Explanation will be given about a case where an n number of session keys $E_{MKi}(S_K)$ (i=1 to n) are recorded on a DVD.

A DVD player (a deciphering unit 114b) has an m (2<m<n) number of master keys $M_{Kj}$ (j is in the range of 1 to n) in it. The m number of master keys have been selected from the n number of master keys beforehand. The master keys $M_{Kj}$ are assumed to be allocated exclusively to the DVD player maker. It is assumed that n=100 and m=10.

A method of recording $E_{SK}(S_K)$ on a DVD as key judgment information is used (the section indicated by numeral 302 in FIG. 12 uses $E_{SK}(S_K)$ as key judgment information).

A key control organization 200 keeps master keys $M_{Ki}$ (i=1 to 100). It is desirable that the number of master keys should be set at a larger value than necessary in preparation for the entry of a new player maker or in case a master key is broken.

The key control organization 200 exclusively allocates the master keys $M_{Ki}$ (i=1 to 100) to the individual player makers 201 to 203. For example, as shown in FIG. 11, it allocates master keys $M_{Ki}$ (i=10 to 19) to player maker A, master keys $M_{Ki}$ (i=20 to 29) to player maker B, and master keys $M_{Ki}$ (i=30 to 39) to player maker C. The key control organization 200 sends the allocated master keys to the individual player makers by means of communication mediums or recording mediums. At that time, it is desirable that they should be exchanged safely by enciphered communication.

Each player maker controls the master keys allocated by the key control organization 200. Using the allocated master keys, each player maker manufactures DVD players with the configuration as shown in the third embodiment and sells the resulting products.

It is assumed that the key control organization 200 does not give the plain data on the master keys to disk makers 221 to 223.

First, each disk maker (e.g., maker a) determines the first session key $S_K$ (e.g., for each disk) by itself, and gives the first session key $S_K$ to the key control organization 200. The key control organization 200 enciphers the received first session key $S_K$ using all the master keys $M_{Ki}$ (i=1 to 100) to produce $E_{MKi}(S_K)$ (i=1 to 100) (using the enciphering unit 301 of FIG. 12). Then, the key control organization 200 gives $E_{MKi}(S_K)$ (i=1 to 100) to disk maker a.

It is desirable that the exchange of the allocated master keys between the key control organization 200 and the disk maker should be made by means of communication mediums or recording mediums through enciphered communication.

Disk maker a records $E_{MKi}(S_K)$ (i=1 to 100), $E_{SK}(S_K)$, and $E_{SK}$(Data) on a DVD 231. The operation of enciphering $S_K$ with $S_K$ itself to produce $E_{SK}(S_K)$ is carried out by the disk maker side or by the key control organization 200 side (using the enciphering circuit 321 of FIG. 12) in the case of enciphering with a mater key. It is assumed that at least the enciphering of the contents is done at the disk maker side (using the enciphering circuit 303 of FIG. 12).

Disk maker a controls the received $E_{MKi}(S_K)$, key judgment information $E_{SK}(S_K)$, and $E_{SK}$(Data) (or Data) for $S_K$, for example.

The same is true for the other disk makers.

In case it is found that the master key has been broken, from that time on, DVDs are manufactured without using the broken master key. For example, if the master key for i=19 has been broken, ninety-nine $E_{MKi}(S_K)$ corresponding to i=1 to 18 and 20 to 100 are recorded on a DVD.

In case it is found that the master key has been broken, it is desirable that the player maker to which the broken master key has been allocated should manufacture and sell DVD players excluding the broken master key. For example, if the master key for i=19 has been broken, player maker A manufactures DVD players using the master keys for i=10 to 18 and sells the resulting products.

The already sold DVD player having the master key for i=19 may be used without any modification. It may be modified so as not to have the master key for i=19.

Consequently, the master keys can be controlled safely and effectively. In addition, the risk of the master key being deciphered in an unauthorized manner can be dispersed and even after the deciphering of the master key, the system can function safely and effectively.

As describe in detail, with the present invention, only the correct maker having at least one of a plurality of second keys can get the first key and therefore can get the plain data of the data enciphered using the first key.

As a result, the wrongful conduct of making unauthorized copies and selling the thus copied mediums can be prevented, thereby protecting copyrights.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A deciphering device comprising:

a reading unit configured to read first information composed of enciphered data obtained by enciphering data with a first key, second information composed of a p number of enciphered first keys, where p is an integer greater than or equal to two, obtained by enciphering said first key with a p number of seconds keys, respectively, and third information used for key determination from a recording medium on which said first information, said second information and said third information have been stored;

a storage unit configured to store at least one of said p number of second keys;

a first deciphering unit configured to decipher one of the enciphered first keys selected in the order determined from said second information using one second key selected in the order determined from said p number of second keys stored in said storage unit, determine on the basis of said deciphering result and said third information whether or not said first key obtained by said deciphering is correct, and repeat said selection and said determination until the first key determined to be correct has been obtained; and a second deciphering unit configured to decipher said enciphered data of said first information using said first key said first deciphering unit has determined to be correct.

2. A deciphering device according to claim 1, wherein:

said third information is information obtained by enciphering said first key with said first key itself; and when the key obtained by deciphering one of said second information using one of said second keys stored in said storage unit coincides with the key obtained by deciphering said third information using the former key, said first deciphering unit determines that the former key is the correct first key.

3. A deciphering device according to claim 1, wherein said data includes at least one of key information, documents, sound, images, and programs.

4. A deciphering device comprising:

a first unit built in a driving unit of a recording medium or connected to a driving unit of said recording medium without the CPU bus of a computer, including; by enciphering data with a first key, second information composed of a p number of enciphered first keys, where p is an integer greater than or equal to two, obtained by enciphering said first key with a p number of second keys, respectively, and third information used for key determination in such a manner that at least said second information and third information are transferred safely without being externally acquired; and a second unit connected to said first unit via the CPU bus of said computer including:

a unit configured to receive said first information, second information, and third information from said first unit via the CPU bus of said computer in such a manner that at least said second information and third information are received safely without being externally acquired;

a storage unit configured to store at least one of said p number of second keys;

a first deciphering unit configured to decipher one of the enciphered first keys selected in the order determined from said second information using one second key selected in the order determined from said p number of second keys stored in said storage unit, determine on the basis of said deciphering result and said third information whether or not said first key obtained by said deciphering is correct, and repeat said selection and said determination until the first key determined to be correct has been obtained; and a second deciphering unit configured to decipher said enciphered data of said first information using said first key said first deciphering unit has determined to be correct.

5. A deciphering device according to claim 4, wherein:

said third information is information obtained by enciphering said first key with said first key itself; and when the key obtained by deciphering one of said second information using one of said second keys stored in said storage unit coincides with the key obtained by deciphering said third information using the former key, said first deciphering unit determines that the former key is the correct first key.

6. A deciphering device according to claim 4, wherein said data includes at least one of key information, documents, sound, images, and programs.

7. A deciphering device comprising:

a reading unit configured to read first information composed of an enciphered third key obtained by enciphering a third key with a first key, second information composed of a p number of enciphered first keys, where p is an integer greater than or equal to two, obtained by enciphering said first key with a p number of seconds keys, respectively, third information used for key determination, and fourth information composed of enciphered data obtained by enciphering data with said third key from a recording medium on which said first information, said second information, said third information, and said fourth information have been stored;

a storage unit configured to store at least one of said p number of second keys;

a first deciphering unit configured to decipher one of the enciphered first keys selected in the order determined from said second information using one second key selected in the order determined from said p number of second keys stored in said storage unit, determine on the basis of said deciphering result and said third information whether or not said first key obtained by said deciphering is correct, and repeat said selection and said determination until the first key determined to be correct has been obtained;

a second deciphering unit configured to decipher said enciphered third key of said first information using said first key said first deciphering unit has determined to be correct; and a third deciphering unit configured to decipher said enciphered data of said fourth information using said third key obtained by said second deciphering unit.

8. A deciphering device according to claim 7, wherein:

said third information is information obtained by enciphering said first key with said first key itself; and when the key obtained by deciphering one of said second information using one of said second keys stored in said storage unit coincides with the key obtained by deciphering said third information using the former key, said first deciphering unit determines that the former key is the correct first key.

9. A deciphering device according to claim 7, wherein said data includes at least one of key information, documents, sound, images, and programs.

10. A deciphering method comprising of the steps of:

reading first information composed of enciphered data obtained by enciphering data with a first key, second information composed of a p number of enciphered first keys, where p is an integer greater than or equal to two, obtained by enciphering said first key with a p number of second keys, respectively, and third information used for key determination from a recording medium on which said first information, said second information, and said third information have been stored;

deciphering one of the enciphered first keys selected in the order determined from said second information using one second key selected in the order determined from said p number of second keys, determining on the basis of said deciphering result and said third information whether or not said first key obtained by said deciphering is correct, and repeating said selection and said determination until the first key determined to be correct has been obtained; and deciphering said enciphered data of said first information using said first key determined to be correct.

11. A deciphering method comprising the steps of:

transferring first information composed of enciphered data obtained by enciphering data with a first key, second information composed of a p number of enciphered first keys, where p is an integer greater than or equal to two, obtained by enciphering said first key with a p number of second keys, respectively, and third information used for key determination from a first unit built in a driving unit of a recording medium or connected to the driving unit of said recording medium without a CPU bus of a computer to a second unit via the CPU bus of the computer in such a manner that at least said second information and third information are transferred safely without being externally acquired; and in said second unit, deciphering one of the enciphered first keys selected in the order determined from said second information using one second key selected in the order determined from said p number of second keys stored in said storage unit, determining on the basis of said deciphering result and said third information whether or not said first key obtained by said deciphering is correct, repeating said selection and said determination until the first key determined to be correct has been obtained, and deciphering said enciphered data using said first key determined to be correct.

12. A deciphering method comprising the steps of:

reading first information composed of an enciphered third key obtained by enciphering a third key with a first key, second information composed of a p number of enciphered first keys, where p is an integer greater than or equal to two, obtained by enciphering said first key with a p number of second keys, respectively, third information used for key determination, and fourth information composed of enciphered data obtained by enciphering data with said third key from a recording medium on which said first information, said second information, said third information, and said fourth information have been stored;

deciphering one of the enciphered first keys selected in the order determined from said second information using one second key selected in the order determined from said p number of second keys, determining on the basis of said deciphering result and said third information whether or not said first key obtained by said deciphering is correct, and repeating said selection and said determination until the first key determined to be correct has been obtained;

deciphering said enciphered third key of said first information using said first key determined to be correct; and deciphering said enciphered data of said fourth information using said third key obtained.

13. A deciphering unit device that receives information via the CPU bus of a computer from a bus transfer unit built in a driving unit of a recording medium or connected to the driving unit of said recording medium without the CPU bus of the computer and deciphers data on the basis of the information, said deciphering unit device comprising;

a unit configured to receive first information composed of enciphered data obtained by enciphering data read from said recording medium with a first key, second information composed of a p number of enciphered first keys, where p is an integer greater than or equal to two, obtained by enciphering said first key with a p number of second keys, respectively, and third information used for key determination from said bus transfer unit via the CPU bus of said computer in such a manner that at least said second information and third information are received safely without being externally acquired;

a storage unit configured to store at least one of said p number of second keys;

a first deciphering unit configured to decipher one of the enciphered first keys selected in the order determined from said second information using one second key selected in the order determined from said p number of second keys stored in said storage unit, determine on the basis of said deciphering result and said third information whether or not said first key obtained by said deciphering is correct, and repeating repeat said selection and said determination until the first key determined to be correct has been obtained; and a second deciphering unit configured to decipher said enciphered data of said first information using said first key said first deciphering unit has determined to be correct.

14. A deciphering device comprising:

an input unit configured to input first information including a p number of enciphered first keys obtained by enciphering a first key with a p number of second keys respectively, where p is an integer greater than or equal to two, and second information including an enciphered first key obtained by enciphering said first key with said first key itself;

a storage unit configured to store at least one of said p number of second keys; and a key judging unit comprising:

a first deciphering unit configured to decipher one of said p number of enciphered first keys included in said first information using one of said second keys stored in said storage unit and to obtain a first deciphered result;

a second deciphering unit configured to decipher the enciphered first key included in said second information using the first deciphered result obtained from said first deciphering unit and to obtain a second deciphered result;

a comparison unit configured to compare the first deciphered result with the second deciphered result, and an output unit configured to output one of the first deciphered result and the second deciphered result as a correct first key, when said comparison unit indicates that the first deciphered result coincides with the second deciphered result.

15. A deciphering device according to claim 14, further comprising:

a third information input unit configured to input third information including enciphered data obtained by enciphering data with the first key; and a third deciphering unit configured to decipher the enciphered data included in said third information using the correct first key output from said output unit.

16. A deciphering device that deciphers information from a CPU bus of a computer, said deciphering device comprising:

an input unit configured to input from the CPU bus of said computer, first information including a p number of enciphered first keys obtained by enciphering a first key with a p number of second keys respectively, where p is an integer greater than or equal to two, and second information including an enciphered first key obtained by enciphering said first key with said first key itself;

a storage unit configured to store at least one of said p number of second keys; and a key judging unit comprising:

a first deciphering unit configured to decipher one of said p number of enciphered first keys included in said first information using one of said second keys stored in said storage unit and to obtain a first deciphered result;

a second deciphering unit configured to decipher the enciphered first key included in said second information using the first deciphered result obtained from said first deciphering unit and to obtain a second deciphered result;

a comparison unit configured to compare the first deciphered result with the second deciphered result, and an output unit configured to output one of the first deciphered result and the second deciphered result as a correct first key, when said comparison unit indicates that the first deciphered result coincides with the second deciphered result.

17. A deciphering device according to claim 16, further comprising:

a third information input unit configured to input third information including enciphered data obtained by enciphering data with the first key; and a third deciphering unit configured to decipher the enciphered data included in said first information using the correct first key output from said output unit.

18. A deciphering device comprising:

an input unit configured to input first information including a p number of enciphered first keys obtained by enciphering a first key with a p number of second keys respectively, where p is an integer greater than or equal to two, second information including an enciphered first key obtained by enciphering said first key with said first key itself, and third information including an enciphered third key obtained by enciphering a third key with said first key;

a storage unit configured to store at least one of said p number of second keys; and a key judging unit comprising:

a first deciphering unit configured to decipher one of said p number of enciphered first keys included in said first information using one of said second keys stored in said storage unit and to obtain a first deciphered result;

a second deciphering unit configured to decipher the enciphered first key included in said second information using the first deciphered result obtained from said first deciphering unit and to obtain a second deciphered result;

a comparison unit configured to compare the first deciphered result with the second deciphered result;

an output unit configured to output one of the first deciphered result and the second deciphered result as a correct first key, when said comparison unit indicates that the first deciphered result coincides with the second deciphered result; and a third deciphering unit configured to decipher the enciphered third key included in said third information to obtain the third key using the correct first key output from said output unit.

19. A deciphering device according to claim 18, further comprising:

a fourth information input unit configured to input fourth information including enciphered data obtained by enciphering data with the third key; and a fourth deciphering unit configured to decipher the enciphered data included in said fourth information using the third key obtained from said third deciphering unit.

20. An information providing device to provide information to be recorded on a removable recording medium, comprising:

a first generating unit configured to generate first information including enciphered data obtained by enciphering data with a first key;

a second generating unit configured to generate second information including a p number of enciphered first keys obtained by enciphering said first key with a p number of second keys respectively, where p is an integer greater than or equal to two;

a third generating unit configured to generate third information including an enciphered first key obtained by enciphering said first key with said first key itself; and a providing unit configured to provide the obtained first information, second information, and third information to be recorded on said removable recording medium.

21. An information providing device to provide information to be recorded on a removable recording medium, comprising:

a first generating unit configured to generate first information including enciphered data obtained by enciphering data with a first key;

an output unit configured to output said first key from said information providing device;

an input unit configured to input second information from outside of said information providing device, said second information including a p number of enciphered first keys obtained by enciphering said first key with a p number of second keys respectively, where p is an integer greater than or equal to two;

a second generating unit configured to generate third information including an enciphered first key obtained by enciphering said first key with said first key itself; and a providing unit configured to provide the obtained first information, second information, and third information to be recorded on said removable recording medium.

22. An information providing device to provide information to be recorded on a removable recording medium, comprising:

a first generating unit configured to generate first information including enciphered data obtained by enciphering data with a first key;

a second generating unit configured to generate second information including a p number of enciphered first keys obtained by enciphering said first key with a p number of second keys respectively, where p is an integer greater than or equal to two;

a third generating unit configured to generate third information including an enciphered first key obtained by enciphering said first key with said first key itself;

a fourth generating unit configured to generate fourth information including an enciphered third key obtained by enciphering a third key with said first key; and a providing unit configured to provide the obtained first information, second information, third information, and fourth information to be recorded on said removable recording medium.

23. An information providing device to provide information to be recorded on a removable recording medium, comprising:

a first generating unit configured to generate first information including enciphered data obtained by enciphering data with a first key;

an output unit configured to output said first key from said information providing device;

an input unit configured to input second information from outside of said information providing device, said second information including a p number of enciphered first keys obtained by enciphering said first key with a p number of second keys respectively, where p is an integer greater than or equal to two;

a second generating unit configured to generate third information including an enciphered first key obtained by enciphering said first key with said first key itself;

a third generating unit configured to generate fourth information including an enciphered third key obtained by enciphering a third key with said first key; and a providing unit configured to provide the obtained first information, second information, third information, and fourth information to be recorded on said removable recording medium.

* * * * *